United States Patent
Marsee

(10) Patent No.: US 10,859,998 B2
(45) Date of Patent: Dec. 8, 2020

(54) SYSTEM, APPARATUS, AND METHOD FOR AUTONOMOUS ACTIVATION OF AN OPTICAL FORKLIFT ALIGNMENT APPARATUS USING SENSORS

(71) Applicant: Vis Vires IP, LLC, Temple Terrace, FL (US)

(72) Inventor: Shawn Marsee, Temple Terrace, FL (US)

(73) Assignee: VIS VIRES IP, LLC, Cocoa Beach, FL (US)

( * ) Notice: Subject to any disclaimer, the term of this patent is extended or adjusted under 35 U.S.C. 154(b) by 180 days.

(21) Appl. No.: 15/777,431

(22) PCT Filed: Oct. 17, 2016

(86) PCT No.: PCT/US2016/057351
§ 371 (c)(1),
(2) Date: May 18, 2018

(87) PCT Pub. No.: WO2017/087109
PCT Pub. Date: May 26, 2017

(65) Prior Publication Data
US 2018/0370780 A1    Dec. 27, 2018

Related U.S. Application Data

(60) Provisional application No. 62/392,987, filed on Jun. 17, 2016, provisional application No. 62/386,164, filed on Nov. 19, 2015.

(51) Int. Cl.
*G05B 19/402* (2006.01)
*B66F 9/075* (2006.01)
(Continued)

(52) U.S. Cl.
CPC .......... *G05B 19/402* (2013.01); *B66F 9/0755* (2013.01); *B66F 9/24* (2013.01); *B66F 9/20* (2013.01); *G05B 2219/45049* (2013.01)

(58) Field of Classification Search
CPC . B66F 9/0755; B66F 9/24; B66F 9/20; G05B 19/402; G05B 2219/45049
See application file for complete search history.

(56) References Cited

U.S. PATENT DOCUMENTS

| | | |
|---|---|---|
| 3,149,196 A | 9/1964 | Roth |
| 3,672,470 A | 6/1972 | Ohntrup et al. |

(Continued)

OTHER PUBLICATIONS

International Search Report, dated Jan. 13, 2017, for International Application No. PCT/US16/57351, 2 pages.
(Continued)

*Primary Examiner* — Chun Cao

(57) ABSTRACT

An activation system and method for an optical alignment system that may comprise one or more sensors selected from the group consisting of accelerometers, gyroscopes, magnetometers, Inertial Measurement Units (IMUs), and pressure sensors. The system may also comprise at least one limit switch. The sensors and switch provide signals containing information about the movement, position or orientation of the system to a controller. The controller uses the sensor and switch information to estimate the position or orientation, or both, of the system. The system activates the optical alignment light source when predetermined thresholds are exceeded. Filtering such as low-pass, high-pass, and other filtering such as Kalman filtering may be used to remove unwanted frequencies from the filter data prior to processing by the controller. The invention may comprise the activation system alone or in combination with an optical alignment system. An exemplary use is for forklift optical alignment systems.

22 Claims, 11 Drawing Sheets

(51) Int. Cl.
  *B66F 9/24* (2006.01)
  *B66F 9/20* (2006.01)

(56) References Cited

U.S. PATENT DOCUMENTS

| | | | |
|---|---|---|---|
| 3,854,820 A | 12/1974 | Hansen | |
| 4,279,328 A | 7/1981 | Ahlbom | |
| 5,208,753 A * | 5/1993 | Acuff | B66F 9/0755 |
| | | | 414/633 |
| 6,120,052 A | 9/2000 | Capik et al. | |
| 6,150,938 A * | 11/2000 | Sower | B66F 9/0755 |
| | | | 250/491.1 |
| 6,388,748 B1 | 5/2002 | Kokura | |
| 6,411,210 B1 | 6/2002 | Sower et al. | |
| 6,713,750 B2 | 3/2004 | Goddard | |
| 6,795,187 B2 | 9/2004 | Kokura | |
| 7,287,625 B1 * | 10/2007 | Harris | B66F 9/0755 |
| | | | 187/237 |
| 8,220,169 B2 * | 7/2012 | Goddard | B66F 9/0755 |
| | | | 33/264 |
| 8,763,759 B2 * | 7/2014 | Viereck | B66F 9/0755 |
| | | | 187/222 |
| 9,932,213 B2 * | 4/2018 | Buchmann | B66F 9/0755 |
| 2008/0011554 A1 * | 1/2008 | Broesel | B66F 9/0755 |
| | | | 187/224 |
| 2010/0234993 A1 * | 9/2010 | Seelinger | B25J 9/1697 |
| | | | 700/254 |
| 2012/0060383 A1 * | 3/2012 | Goddard | B66F 9/0755 |
| | | | 33/228 |
| 2015/0019266 A1 | 1/2015 | Stempora | |
| 2018/0078266 A1 * | 3/2018 | Fry | A61B 90/37 |

OTHER PUBLICATIONS

Written Opinion of the International Searching Authority dated Jan. 13, 2017, for International Application No. PCT/US16/57351, 10 pages.

* cited by examiner

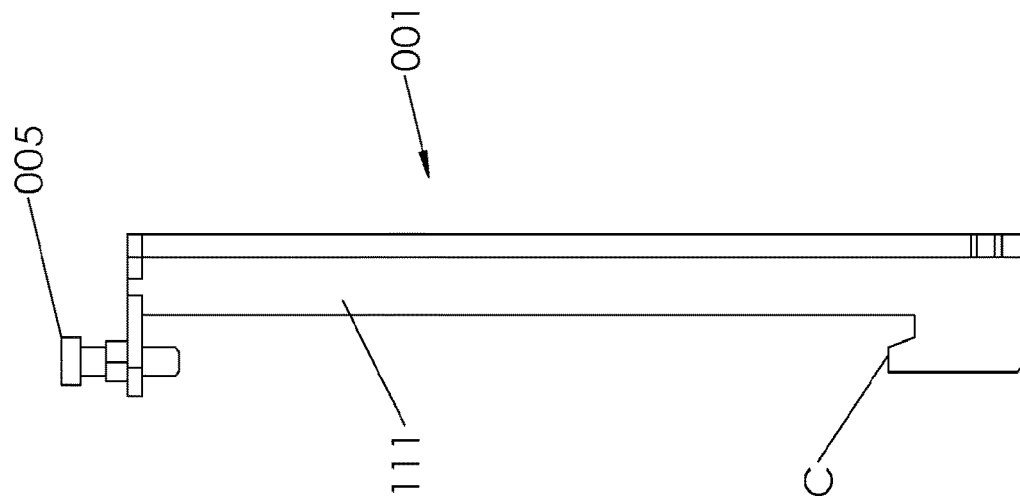
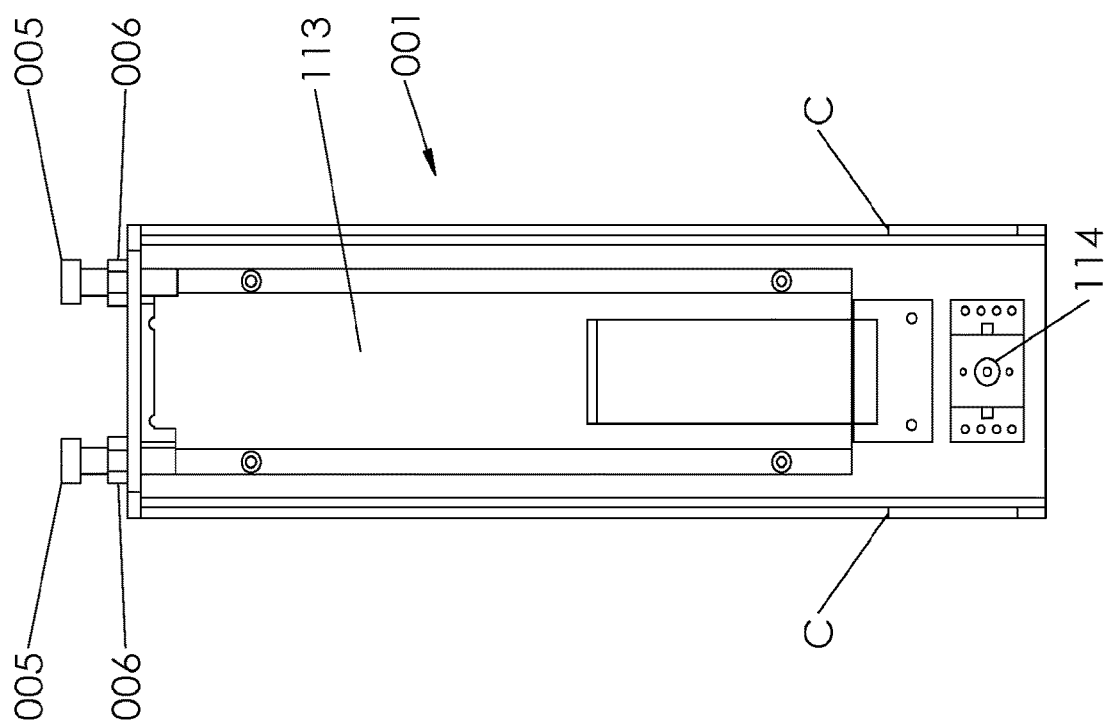

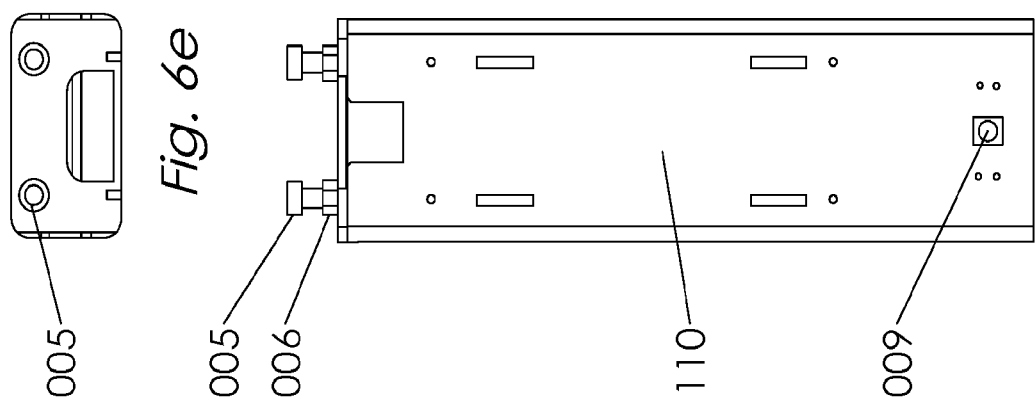

SYSTEM, APPARATUS, AND METHOD FOR AUTONOMOUS ACTIVATION OF AN OPTICAL FORKLIFT ALIGNMENT APPARATUS USING SENSORS

CROSS REFERENCE TO RELATED APPLICATIONS AND INCORPORATION BY REFERENCE

This non-provisional international patent application, filed under the Patent Cooperation Treaty (PCT) is a non-provisional of and claims benefit of priority to U.S. provisional application Ser. No. 62/386,164, filed in the United States Patent and Trademark Office on 19 Nov. 2015, which is hereby incorporated by reference in its entirety; and also is a non-provisional of and claims benefit of priority to U.S. provisional application Ser. No. 62/392,987, filed in the United States Patent and Trademark Office on Jun. 17, 2016, which is also hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to an apparatus comprising various embodiments and methods for autonomous activation of electromechanical systems. More specifically the field of the invention relates to devices and methods for autonomous activation of optical alignment systems utilized for the alignment of forks with a load to be carried by a forklift.

2. Background Art

What is needed in the art, and one of the objects of the present invention, is to provide an autonomously activated optical alignment system for use by forklift operators to assist the operators by eliminating the need to manually activate an optical forklift alignment system. Forklift alignment systems are advantageous in that they allow a forklift operator to accurately place the forks in the proper position for inserting into a load to be carried or underneath the load to be carried which may be for instance a pallet or other load. Optical alignment systems provide a self-contained apparatus that projects a beam of light onto the load and a point which the operator may use to align the forks to the proper position relative to the load. The apparatus and method of the invention are usable for autonomously activating any electromechanical system when certain predetermined thresholds or threshold ranges are exceeded, and thus the scope of the invention is not limited to use with optical alignment systems for forklifts.

Autonomously activated optical alignment systems are advantageous in that they reduce operator workload by eliminating the need for the operator to manually activate the optical forklift alignment system, thus reducing operator workload and conserving battery power. This allows the forklift operator to keep their hands on the forklift operating controls, enabling concentration on the forklift operations and resulting in safer operation.

BRIEF SUMMARY OF THE INVENTION

The present invention comprises an apparatus and method that have one or more of the following features and/or steps, which alone or in any combination may comprise patentable subject matter.

The optical alignment system described herein may be used to actuate or to de-actuate any optical alignment system. The forklift examples described herein are but one embodiment of the many possible embodiments of the invention. The optical alignment system of the invention may be used to actuate or to de-actuate any optical alignment system that is intended or used to align a system that is subject to changes in magnetic fields, changes in air pressure, vibration, angular velocity, acceleration in any direction, or may have components that may experience movement in any direction.

In accordance with one embodiment of the present invention, the invention comprises an apparatus which provides a visual indication to a forklift operator that the forks, which may be adapted to translate in a vertical, or Z-axis, direction (see FIG. 1) are properly vertically aligned with a load, the apparatus having at least one optical alignment source such as a laser or LED which produces a light beam projecting a visible reference at the same height as the forks creating a focused dot, horizontal line, or similar shape on an object, for example, a pallet. The at least one optical alignment source is typically, but not necessarily, disposed in a mechanical housing that is preferably mounted onto the carriage of the forklift between the forks. The use of MicroElectroMechanical (MEMS) sensors such as one or more accelerometers, one or more gyroscopes, one or more magnetometers, one or more pressure sensors, or one or more Inertial Measurement Units (IMUs), the aforementioned sensors used either individually or in any combination and in any quantity, operates as defined herein to cause activation of the optical alignment source (i.e. turns the laser module on or off) or to activate an intermediate activation means, such as to activate Radio Frequency (RF) Devices which, in turn, communicate wirelessly to provide an activation signal to the laser, commanding it to an active or inactive state.

In an embodiment, the invention may comprise, either standalone or in combination with any of the aforementioned sensors, a magnetic or mechanical switch in electrical communication with the power supply to the invention and in electrical communication, either directly or indirectly, with the optical alignment source(s) of the invention as another means to actuate or de-actuate the optical alignment source(s). The magnetic switch and magnet, or mechanical switch, placement can be located on the forklift components such that as the forks are traveling upward (positive Z direction) the magnetic switch and magnet will pass each other, closing the switch and actuating the optical alignment source(s). Likewise, when the forks are traveling downward (negative Z direction) when the magnetic switch and magnet pass each other the switch, opening the switch and de-actuating the optical alignment source(s).

The sensors of the invention, which may comprise accelerometers, gyroscopes, magnetometers, pressure sensors and IMUs in any combination and in any quantity, each may produce a sensor output signal containing sensor data that is proportional to the measured sensor parameter. These sensor signals may be used alone or in combination by the invention to estimate the ambient air pressure, angular velocity, orientation, linear acceleration (hereby referred to as "acceleration"), linear velocity (hereby referred to as "velocity"), or position of the apparatus. When one or more predetermined thresholds or threshold ranges of ambient air pressure, angular velocity, orientation, acceleration, velocity, or position are exceeded, the apparatus and method of the invention may produce an activation signal to the optical alignment system. Likewise, when predetermined deactivation thresholds or range of thresholds of the invention are exceeded, the apparatus and method of the invention may de-activate the optical alignment system.

The autonomously activated optical alignment apparatus of the invention reduces the possibility of danger to persons in the vicinity of the invention by reducing the likelihood of accidental illumination of their eyes by the optical alignment beam. For example, and not by way of limitation, an embodiment of the invention may automatically activate the optical alignment beam when the apparatus is above a predetermined height parameter, which may be any value but may be, as an example, 8 ft above the ground, thus keeping the optical alignment beam above the average person's eye level, when that person is standing on the ground approximately facing the front of the forklift. The invention also increases battery life by reducing unnecessary "on" time, and, in some embodiments, by utilizing MEMS sensors that use much less electrical power, as much as approximately 1,000 times less power compared to other sensors currently used in the industry such as photo-optic sensors, Hall Effect sensors, ultrasonic sensors, laser distance measuring sensors, RF Receivers/Transmitters, or proximity sensors. The invention also reduces forklift operator workload by eliminating the need for manual activation and "zeroing" a measured or calculated parameter (e.g. the +Z direction height above the ground of a feature of a forklift or apparatus), and reduces the cost of damaged goods by increasing forklift accuracy when aligning forklifts with a load. A feature for such measurement may be, for example, a surface of the forks or carriage of a forklift.

The invention's use of internally located MEMS sensors enable the apparatus of the invention, in an embodiment, to be completely contained internally along with the optical alignment system in a single housing, eliminating the need for expensive external sensors such as photo-optic sensors, hall effect sensors, ultrasonic sensors, laser distance measuring sensors, RF Transmitters, or proximity sensors. In alternate embodiments, however, the sensors of the apparatus may be located remotely from the controller. At least one sensor or at least one switch of the invention, or both, provide sensor or switch signals enabling the controller of the invention to estimate the orientation and/or position of the apparatus such that the optical alignment system is not activated unless the apparatus and forks have exceed predetermined thresholds; for example, are above a certain height from the ground or angle relative to the ground or gravity vector. This is an added safety feature which operates to prevent the optical energy of the optical alignment system from be directed into the eyes of persons within line of sight of the optical alignment system. Also, the sensor signals may be used by the controller of the invention, using non-transitory computer readable and executable instructions stored in a tangible computer readable media, to calculate the angle of the optical alignment system light beam relative to the ground and/or gravity vector such that, if the user chooses, (or if the apparatus software program utilizes this function), the optical alignment system will only activate when the apparatus is disposed at a predetermined angle to the ground (for example, as when the forks are parallel to the ground and can be easily inserted into a pallets). In various alternate embodiments of the invention, the sensors of the invention may be utilized to activate one laser to project a dot, horizontal laser line, or similar shape onto the load, pallet, or other structure to assist the forklift operator with the vertical alignment of the forks with the pallet, and then those sensors may turn on/off that same laser or another laser/LED to provide indication to the forklift operator that the forks are level to the ground and can be inserted into the pallet.

The sensors of the invention provide sensor output signals comprising parameter information that are used by the controller of the apparatus to calculate the ambient air pressure, angular velocity, acceleration, velocity, position and orientation of the apparatus by measuring changes in the acceleration in the X, Y, and Z axes and the changes in angle and/or angular velocity about those axes, as well as changes in local magnetic fields and air pressure. To reduce accumulation error for the accelerometer(s) and their calculation for velocity and distance traveled, certain frequencies of vibration may be filtered out of the calculations using Digital Signal Processing (DSP) filter functions contained within the non-transitory computer readable and executable instructions stored within the tangible computer readable storage media of the invention. These filter functions include but are not limited to Kalman Filters, Moving Average Filters, and Butterworth Filters. Vibration frequencies can also be filtered through selection of electronic components in the circuitry such as resistors, capacitors, etc. There are also mechanical means for vibration isolation of the apparatus and/or sensor(s) from the forklift such as pneumatic or air isolators, mechanical springs and spring-dampers, pads or sheets comprised of flexible materials such as elastomers, plastic, rubber, cork, dense foam and laminate materials, molded and bonded rubber and elastomeric isolators and mounts in any combination. The filter functions, which may be determined by DSP or electronic components selection, and mechanical means for vibration isolation, thus operate to remove vibration sensor data that is not within a specified vibration frequency range, or exceeds, or does not reach, predetermined frequency thresholds. The use of the one or more accelerometers is to produce signals corresponding to the acceleration of the apparatus in any of the X, Y, and Z directions, in any combination. The controller of the invention may then use non-transitory computer readable and executable instructions to mathematically integrate the measured acceleration to determine the velocity of the apparatus in any, or each, axis. The controller may then read and execute non-transitory computer readable and executable instructions to mathematically integrate the velocity of the apparatus to determine the apparatus position in three dimensional space (for example, position relative to the ground in the Z axis). This is directly contrary to U.S. Pat. No. 6,713,750. The one or more accelerometers may also be selected for frequency response such that they cannot detect certain acceleration frequencies. For example, one or more accelerometers may be selected such that they cannot measure frequencies above 10 Hz.

MEMS accelerometers, gyroscopes, and IMUs generally have a slight error in calculating a precise location and orientation. As these calculations of location and orientation continue over time, there is a resulting accumulation of error in position and orientation. There is a need to correct this accumulation in error by reestablishing the correct location and orientation of the apparatus, and "zeroing" the calculation to the correct location. "Zeroing" sets software parameters (e.g. such as +Z direction height above the ground) by interpreting sensor signals and correlating those signals to real life physical nominal forklift operations that follow safety regulations and safety standards (e.g. Occupational Safety and Health Administration), as well as real life forklift physical constraints. Literally, for example, forks cannot go through the ground so a −Z direction parameter measurement/calculation must be reset to 0 ft. Likewise, a forklift cannot continue at a in a direction that exceeds the physical boundaries of its operational environment. An example of an operational environment physical boundary may be the interior dimensions of a warehouse. This zeroing may be performed by the controller of the invention, executing non-transitory computer readable and executable instructions, by several practical methods. For example, if the forks of a forklift are motivated downward (i.e., in the negative Z direction) such that they are placed on the ground and power is removed from the apparatus of the invention, and then power is returned to the apparatus, the controller will execute non-transitory computer readable instructions "zeroing" the calculation of fork height to be at a position of 0 ft above the ground, in other words, the forks are assumed to be in physical contact with the ground. The controller may then continue to receive sensor input signals and to calculate fork height from that reference until the above zeroing method is repeated. This correlates to safety standards and regulations for nominal forklift operations, such as specified in United States of America (USA) OSHA 29 CFR 1910.178 (m)(5)(i) which states "When a powered industrial truck is left unattended, load engaging means shall be fully lowered, controls shall be neutralized, power shall be shut off, and brakes set. Wheels shall be blocked if the truck is parked on an incline." Thus, in an embodiment in which the apparatus uses the forklift battery power, this zeroing to a fork height position parameter of 0 ft will occur every time the forklift is powered back on. In the embodiment in which the apparatus uses its own battery supply, this will occur each time the user connects the battery to the apparatus. Another procedure for zeroing forklift height from the ground is utilize a timer, which may be a timer operated in the controller executing non-transitory computer readable instructions, so after a certain predetermined amount of time has passed, for example 60 seconds, and the apparatus has not sensed any movement (e.g. changes in acceleration, velocity, position, magnetic field, or ambient pressure), the invention will assume the forklift is not in use and forks are close to ground level and reestablish the position of the forks to be at 0 ft. above the ground and the acceleration and velocity in the X, Y, or Z direction is 0 m/s² and 0 m/s, respectively. Another method of zeroing forklift height from the ground is measure the accelerations of the apparatus in the X and Y plane (see FIG. 1), which is the acceleration and velocity of the apparatus and forklift traveling on the ground. In this case, if the controller calculates that the apparatus has traveled more than a certain predetermined distance (for example, 10 ft.) parallel to the ground, then it is likely that the forks are not high above the ground for safety reasons and that the forks are close to the ground. In this embodiment, the software parameters for height above the ground in the positive (+) Z direction can be reset to a value that is close to the ground (e.g. 2 ft.). This correlates to safety standards and regulations for nominal forklift operations, such as specified in OSHA 29 CFR 1910.178(n)(7)(iii) which states "On all grades the load and load engaging means shall be tilted back if applicable, and raised only as far as necessary to clear the road surface." Another method of zeroing forklift height from the ground is that if the calculated position is a negative number, then the current position may be established as being 0 ft above the ground, since it is know that the forks of the forklift cannot physically go through ground level into the ground. Similar methods may be executed by the apparatus to correct accumulation of error in calculating the orientation of the forks such as the position or angle of the forks relative to the X, Y, and Z planes as depicted in the figures or height relative to the ground. Another method for zeroing the acceleration and/or velocity calculation is if it does not exceed a threshold, then that acceleration and/or velocity calculation can be established as being 0 m/s² and/or 0 m/s, respectively. For example, if the acceleration threshold is below 0.05 g, then it may be attributed to sensor error and the acceleration value can be corrected to be 0 m/s², and the velocity can be corrected to 0 m/s.

The sensors signals produced by the sensors of the invention may also be used as input signals to the controller, which may in turn cause or enable other activation means such as RF circuitry, ultrasonic sensor(s), inductive proximity sensors, distance measuring lasers, photo-optic sensors, Hall Effect sensors, etc. This can provide a means to preserve battery life so that the RF receiver(s), ultrasonic sensor(s), etc. are not activated unless the apparatus has changed its orientation, acceleration, velocity, or position a predetermined amount, which may be programmed into the computer executable instructions of the invention stored in memory and accessed by the controller. For example, if a magnetometer of the apparatus provides a signal indicating that its orientation has changed exceeding a predetermined threshold, then it may provide an activation signal to the optical alignment system of a forklift or it may activate circuitry such as an RF Receiver(s), proximity sensor(s), etc. which can then be used to activate or deactivate the optical alignment system. A magnetometer of the invention may be used to sense the natural magnetic field of the Earth, or, alternatively, an artificial magnetic field created by placing a magnet on a surface of the forklift such that as the forks and apparatus are moved up or down, and thus may provide an output signal proportion to the strength of the magnetic field or indicating the magnetometer's orientation relative to the sensed magnetic field. These sensor measurements will be modulated by either the varying strength of the magnetic field as the magnetometer is translated relative to the magnetic field, or by a change of orientation, such as rotation, of the magnetometer relative to the magnetic field flux lines. When the orientation of the magnetometer to the magnetic field flux lines exceeds a predetermined change in angle, or when the measured magnetic field value exceeds a predetermined value, the controller may produce an activation signal to the optical alignment system. Even when a forklift utilizing the apparatus of the invention is powered up, there is a flow of current which creates a magnetic field which can be detected by a magnetometer of the invention, which may be used as an input signal to the controller which may, in turn, produce an activation signal to the optical alignment system.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 6a depicts an orthogonal rear view of an embodiment of the apparatus of the invention.

FIG. 6b depicts an orthogonal right view of an embodiment of the apparatus of the invention.

FIG. 6c depicts an orthogonal front view of an embodiment of the apparatus of the invention.

FIG. 6d an orthogonal left side view of an embodiment of the apparatus of the invention.

FIG. 6e an orthogonal top view of an embodiment of the apparatus of the invention.

DETAILED DESCRIPTION OF THE INVENTION

Figure 1:
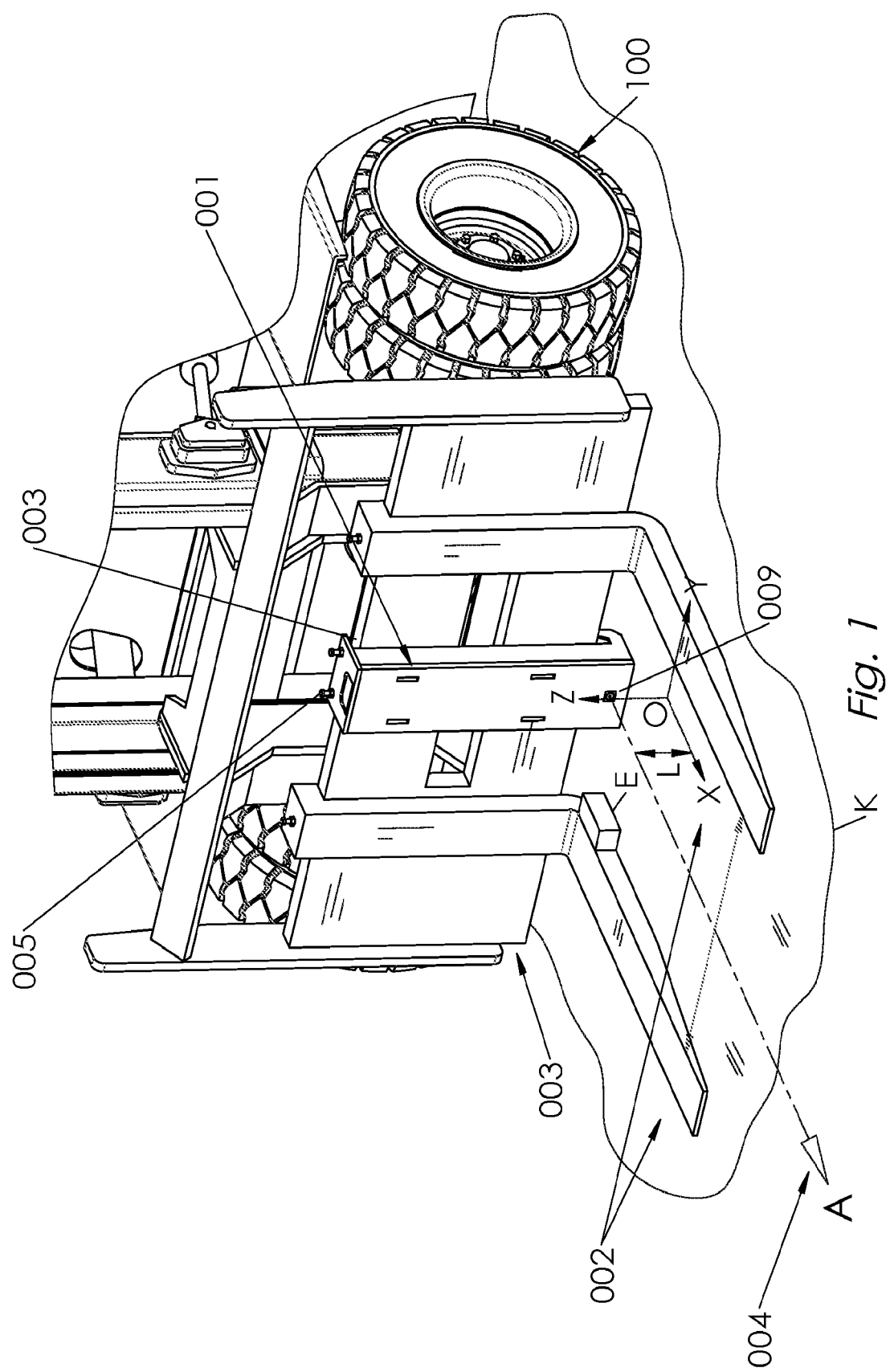
FIG. 1 depicts a front perspective view of an embodiment of the invention installed on a forklift, depicting an optical alignment beam transmitted from the optical alignment system.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used herein, "activate" means to either 1) provide a signal to a circuit that, in turn, provides power to an electromechanical system; or 2) directly provide power to an electromechanical system. In the embodiment in which the electromechanical system is a laser alignment device, "activate" means to either provide a signal to a circuit that, in turn, provides power to the laser causing the laser to transmit a light beam; or 2) directly provide power to the laser such that it transmits a light beam.

As used herein, "deactivate" means to 1) provide a signal to a circuit that causes power to be removed from an electromechanical system; or 2) directly removes power from an electromechanical system. In the embodiment in which the electromechanical system is a laser alignment device, "deactivate" means to either provide a signal to a circuit that, in turn, removes power from the laser causing the laser to not transmit a light beam; or 2) directly remove power from the laser such that it does not transmit a light beam.

As used herein "optical alignment beam" means a beam of emitted electromagnetic energy. The optical alignment beam may emanate from laser sources, LEDs, or any other source of visible electromagnetic energy.

As used herein "sensor" means any of the following: an accelerometer, a gyroscope, a magnetometer, an IMU, or a pressure sensor.

As used herein "controller" means any electronic device, component, or plurality of devices or components that is capable of reading and executing computer readable and executable instructions. Non-limiting examples of controllers are microprocessors, microcontrollers, firmware controllers, discrete logic, custom Application Specific Integrated Circuits (ASICs), Field Programmable Gate Arrays (FPGAs), Programmable Array Logic (PALs) and other electrical circuits, systems or components that are capable of executing such instructions.

As used herein, "memory", "medium", "media", "computer readable memory", "computer readable medium", "storage media", "computer readable storage media" and "computer readable storage medium" shall include within their meanings only physical non-transitory computer readable hardware, and such terms shall specifically exclude signals per se, carrier waves, propagating signals and other transitory signals. Such physical non-transitory computer readable media may comprise hardware memory that comprises a physical structure for storing data which may include computer executable instructions or data.

As used herein, "instructions" means non-transitory computer readable and executable instructions.

As used herein, "vibration" means as the oscillating, reciprocating, or other periodic motion of a rigid or elastic body or medium forced from a position or state of equilibrium.

As used herein, "sensor fusion" or "fusion" means the combining of sensor data, or data derived from, the output signals of disparate sensors sources such that the resulting combined data has less uncertainty than would be possible is these sources were used individually.

As used herein, "zeroing" sets a parameter or set of parameters (e.g. +Z direction height above the ground) to a known value of any desired magnitude by interpreting sensor signals and correlating those signals to real life physical nominal forklift operations that follow safety regulations and safety standards (e.g. Occupational Safety and Health Administration), as well as real life forklift physical constraints (e.g., forklift forks cannot be disposed at a level below the ground, the forklift will not continue at a constant velocity such that it is translated in a given direction that it exceeds the known size of the warehouse in that direction, and the like). "Zeroing" a parameter value may result in that parameter being set to any value, and is not limited to setting the parameter to zero. As an example, "zeroing" the Z direction height parameter may be done to any predetermined value, such as two ft.

One object of the invention is to provide a means for autonomous activation of an optical alignment system, such as a forklift optical alignment system, when certain environmental parameter thresholds (such as, for example, vibration, acceleration, translation in a given direction, and the like) are met or exceeded. The optical alignment system may be a system that utilizes light sources such as laser(s) or Light Emitting Diode(s) (LEDs) to project at least one light beam that may be utilized by a user, such as, for example, a forklift operator, to understand where forklift forks will contact a load to be picked up by a forklift. The light sources may emit light energy of any wavelength. The most typical wavelengths for this application in the forklift industry range between 500 nm and 700 nm.

Another object of the invention is to provide autonomous activation of an optical alignment system using one or more accelerometers, either alone or in combination with other sensors, to sense acceleration and thereby activate the optical alignment system.

Another object of the invention is to provide autonomous activation of an optical alignment system using one or more gyroscopes, either alone or in combination with other sensors, to sense changes in angular velocity and thereby activate the optical alignment system.

Another object of the invention is to provide autonomous activation of an optical alignment system using one or more magnetometers, either alone or in combination with other sensors, to sense changes in a magnetic field and thereby activate the optical alignment system.

Another object of the invention is to provide autonomous activation of an optical alignment system using one or more pressure sensors, either alone or in combination with other sensors, to sense changes in air pressure and thereby activate the optical alignment system.

Another object of the invention is to provide autonomous activation of an optical alignment system using one or more Inertial Measurement Units (IMUs), either alone or in combination with other sensors, to sense motion and thereby activation the optical alignment system.

Another object of the invention is to provide filtering of the sensor output signals in order to remove unwanted components of the output signals, so that unwanted autonomous activation or deactivation of an optical alignment system is avoided. Sensor output signals may be filtered using DSP filter functions implemented in non-transitory computer readable and executable instructions storied in computer readable media and carried out by a controller that is in communication with the media, electronic components (e.g. capacitors, resistors, etc.), or by using mechanical vibration isolation of the apparatus. One such filter may be a Kalman filter.

Another object of the invention is to provide a magnetic or other switch, such as a mechanical switch, that is adapted to actuate a forklift optical alignment system when the forks of the forklift have traveled in an upward direction beyond a first trigger point, and to de-actuate the forklift optical alignment system when the forks have traveled in a downward direction beyond a second trigger point. The first and second trigger points may be, but are not necessarily, co-located.

Another object of the invention is to provide software algorithms for "zeroing" the electromechanical system to re-set the parameters (e.g. height above the ground in the +Z direction) in order to minimize the accumulation of error in the calculations of acceleration, velocity, and position.

In an embodiment, the apparatus of the invention is an autonomous activation system for an electromechanical system.

In any of the embodiments, the apparatus of the invention may be an autonomous activation system for a forklift optical alignment system.

In a further embodiment, the apparatus of the invention is an electromechanical system comprising an autonomous activation system.

In a further embodiment, the apparatus of the invention is a forklift optical alignment system comprising an autonomous activation system.

In a further embodiment, the apparatus is a method of using sensors to provide an autonomous activation signal to an electromechanical system.

In a further embodiment, the apparatus is a method of using sensors to provide an autonomous activation signal to a forklift optical alignment system.

Referring now to FIG. 1, a perspective front view of a forklift 100 having an embodiment of the invention installed in an exemplary fashion is depicted. Laser alignment system 001 is attached to fork lift back plate (e.g. carriage) 003 by the clamping operation of at least one bolt(s) 005 (also depicted in the side view of FIG. 5) and the surface C and D (depicted in FIG. 5) of the laser alignment system 001 on the upper surface and lower surface of back plate 003. Forks 002 are, typically, attached a structure of the fork lift and extend forward in the direction of the X axis. Optical alignment beam 004 is emitted from an optical alignment source comprising optical alignment system 001. Beam 004 is typically, but is not necessarily, emitted from emitting point 009 along arrow A. A may be disposed in a direction parallel to axis X at a distance L from axis X. References herein to the X, Y or Z axis are made in reference to an orthogonal three-axis coordinate system of origin O in which the positive Z axis is oriented in a direction opposite to the direction of the acceleration of gravity. When the wheels of the forklift are resting on a level surface K, the level surface K forms the X-Y plane of the three axis coordinate system in which the Z parameter is at 0 ft.; i.e., three axis origin O is resting on surface K.

Figure 2:
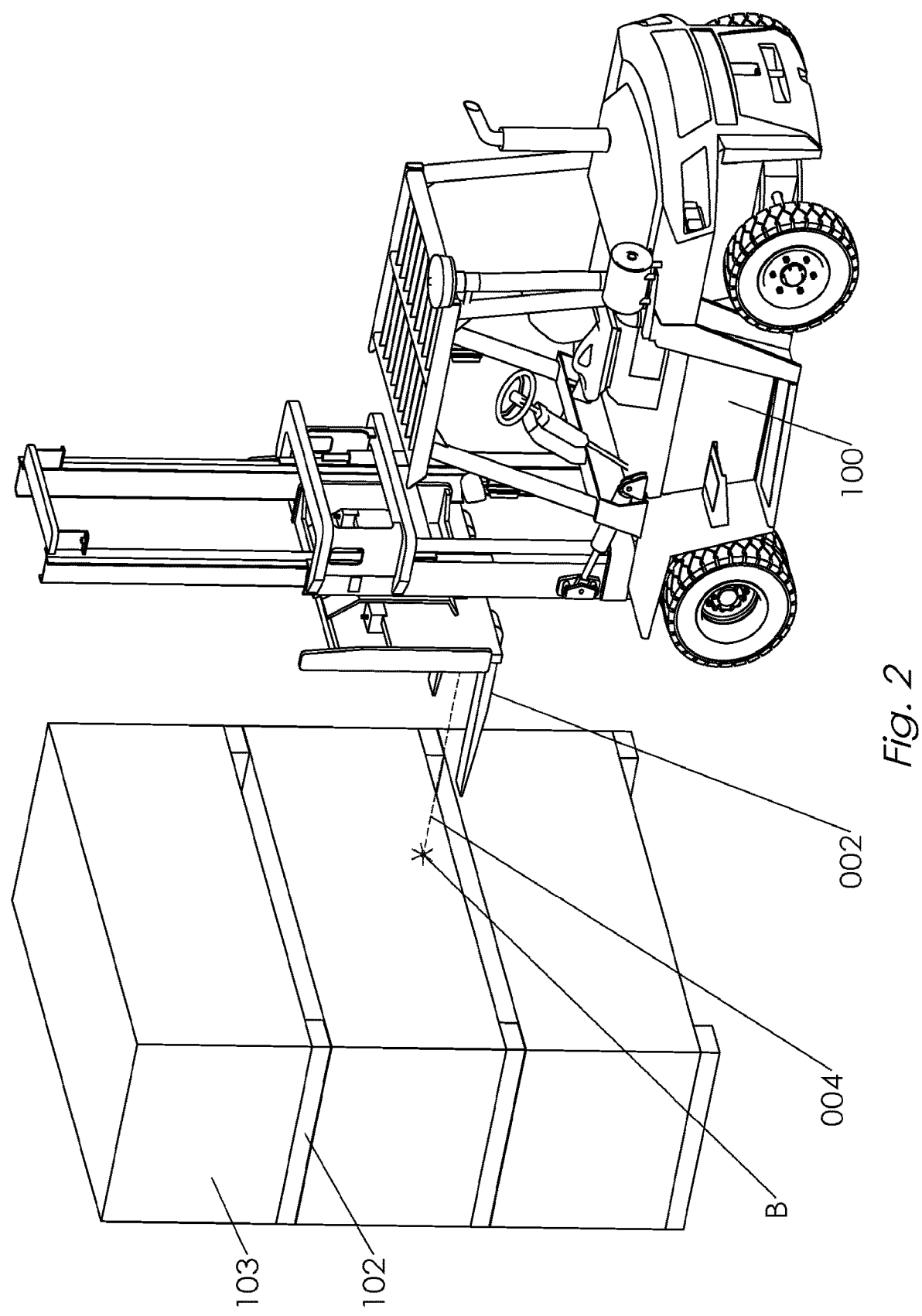
FIG. 2 depicts a rear perspective view an embodiment of the invention installed on a typical forklift, depicting an optical alignment beam transmitted from the optical alignment system and impacting a load to be picked up by the forklift at a beam impact point B.
Figure 3:
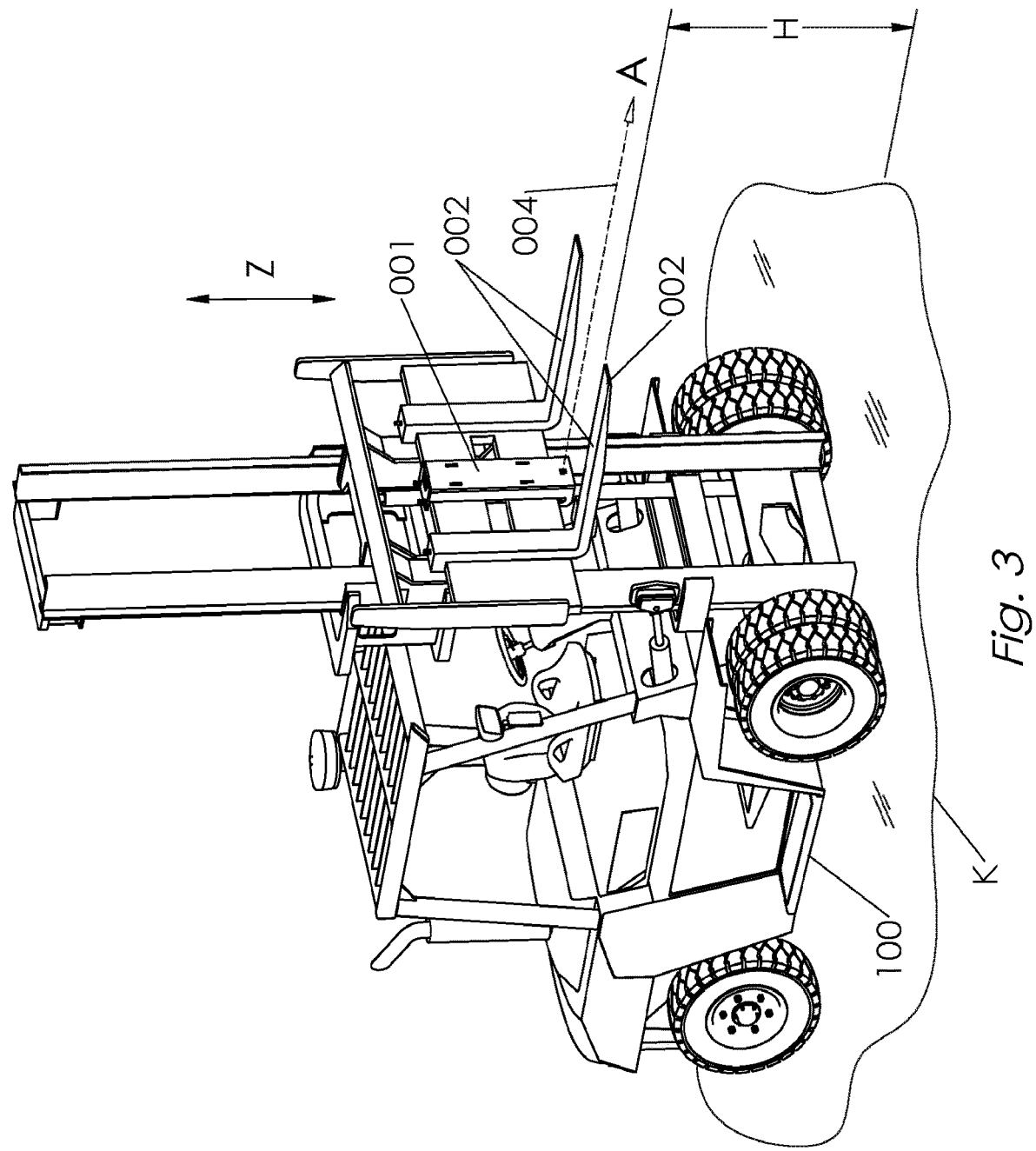
FIG. 3 depicts a front perspective view of an embodiment the invention installed on a forklift, depicting an optical alignment beam transmitted from the optical alignment system.
Figure 4:
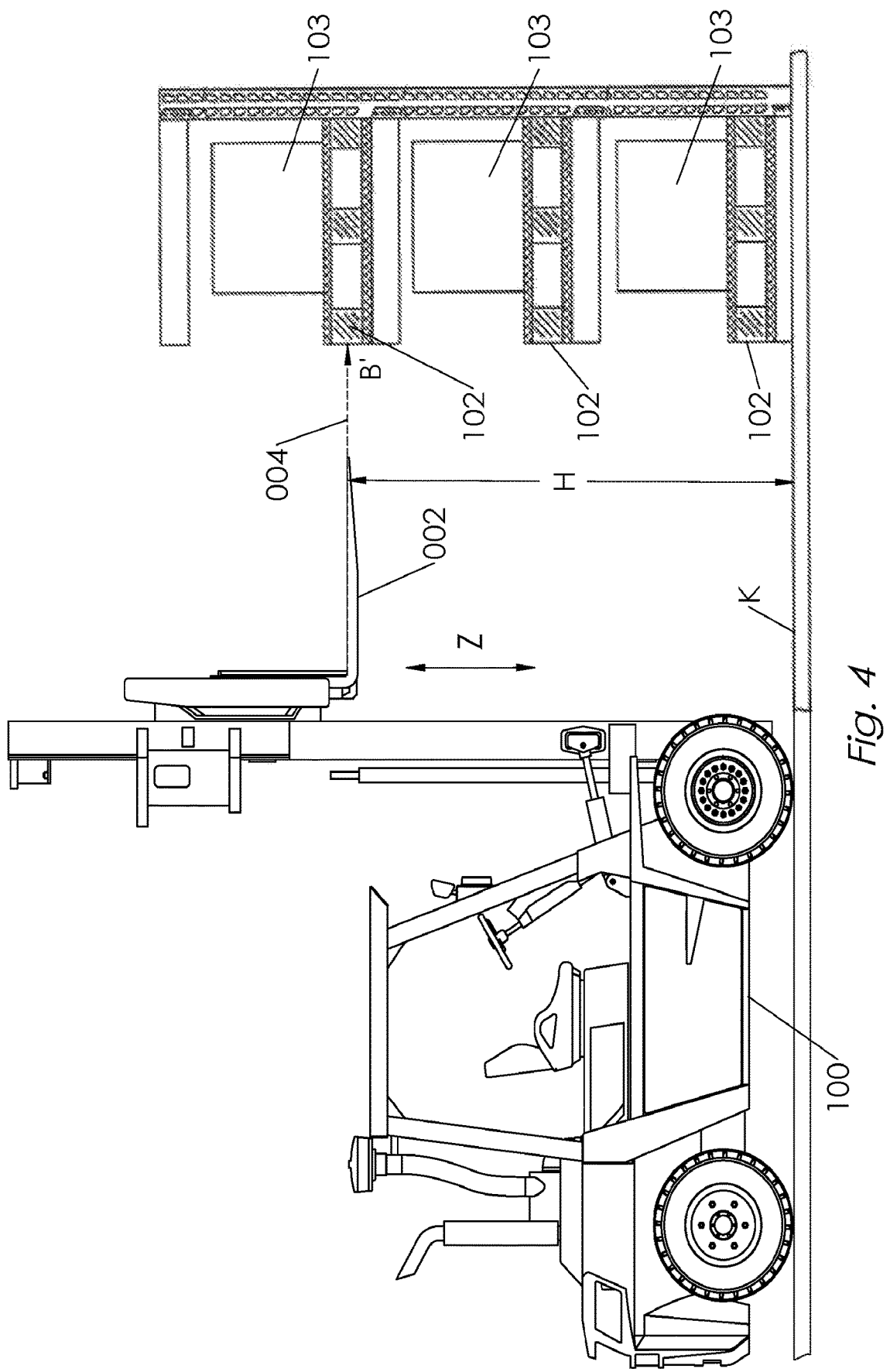
FIG. 4 depicts an orthogonal side view of an embodiment of the invention installed on a typical forklift, depicting an optical alignment beam transmitted from the optical alignment system and impacting a load to be picked up by the forklift at a beam impact point B.

Referring now to FIGS. 2, 3, and 4 rear, front, and side perspective views, respectively, of an embodiment of the invention installed on a typical forklift 100, showing an optical alignment beam 004 transmitted from the optical alignment system and impacting a load to be picked up by forklift 100 at a beam impact point B are depicted. The forklift operator may align forks 002 vertically by using beam impact point B as a reference for the point of prospective impact of the forks as the forklift approaches the load, which may comprise a pallet, so that the forklift operator is informed as to the prospective point of impact of the forks and may use this information to motivate the forks in a vertical direction, either upwards or downwards, so as to adjust the vertical position of the forks to a desired position. Likewise, the operator may use beam impact point B to motivate the forks laterally so that they impact a load, which may be for example a pallet 102 carrying load 103, at a desired position.

Referring now specifically to FIG. 3, laser alignment system 001 emits optical alignment beam 004 along arrow A. Forklift 100 is disposed on support surface K, and forks 002 have been motivated upward in the positive Z direction such that they are a distance H above support surface K.

Referring specifically now to FIG. 4, a forklift 100 comprising an optical alignment system of the invention is shown, in which forks 002 have been vertically motivated along axis Z so as to be positioned at a desired height H above support surface K. An optical alignment beam 004 is emitted so as to indicate the impact point B of the forks. In the example shown in FIG. 4, forks 002 are aligned so as to slide into open spaces in uppermost pallet 102, and thus carry pallet with load 103 disposed thereon using the forklift as desired by a user.

Figure 5:
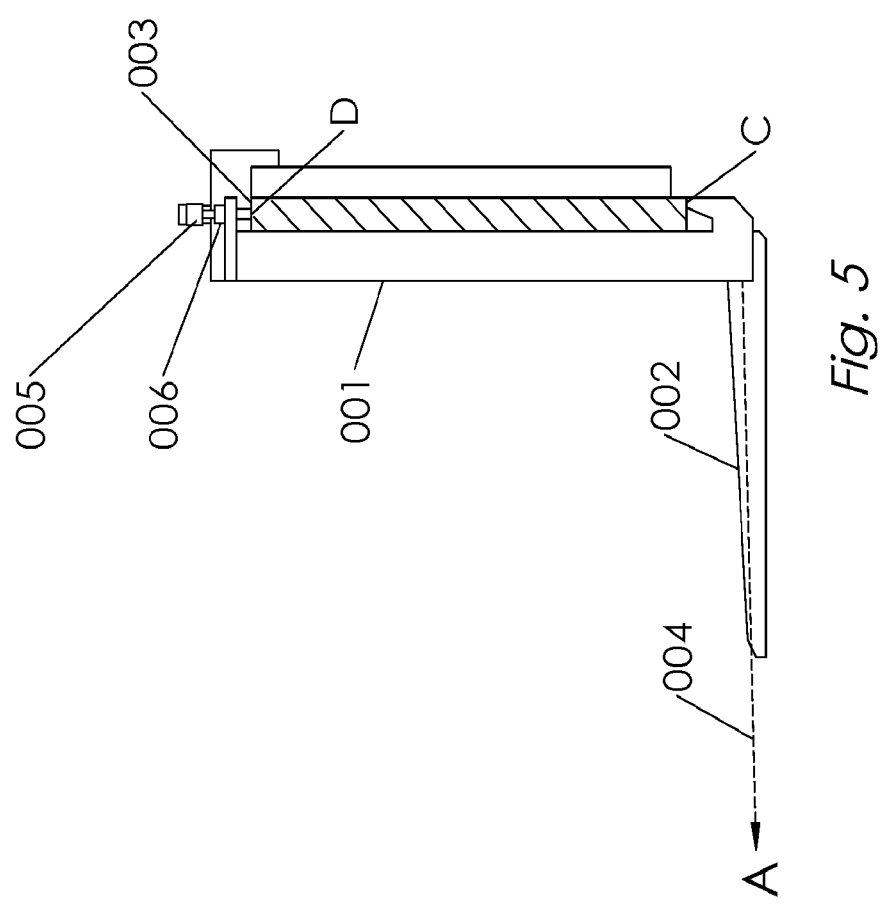
FIG. 5 depicts an orthogonal side view of an optical alignment system of an embodiment of the invention installed on a typical forklift, depicting an optical alignment beam transmitted from the optical alignment system.

Referring now to FIG. 5, an orthogonal side view of an optical alignment system 001 of an embodiment of the invention installed on a typical forklift, depicting an optical alignment beam 004 transmitted from the optical alignment system is depicted. Optical alignment system 001 may be attached to forklift back plate 003 by the tightening of at least one bolt 005 against an upper surface of back plate 003, clamping optical alignment system 001 onto back plate 003 by compressive forces at point C and D. Thus, optical alignment system 001 travels with back plate 003 and thus with forks 002.

Referring now to FIGS. 6a through 6e, orthogonal views of an embodiment of the apparatus of the invention are depicted. While a specific embodiment of the mechanical components of the apparatus is depicted in the figures, these mechanical components may take any functionally equivalent shape, and all such functionally equivalent shapes are within the scope of the claimed invention.

Still referring to FIGS. 6a through 6e, the optical alignment system of the invention 001 may comprise a mechanical structure of any form, but may comprise housing 113 covering the sensors and electrical components of the system, all of which may each be in electrical or wireless data communication with one another by data communication means known in the art such as printed wiring or circuit boards, electrical cabling, wireless communication or the like; optical source 114 which may, for example, be a laser or LED light source or plurality of sources; side plates 111 which each comprise a surface C for clamping onto an underneath surface of a structure of a forklift; bolt(s) 005 and nut(s) 006 for clamping the invention onto a surface of a forklift as depicted in cross section in FIG. 5; optical beam aperture 009 through which light energy is transmitted for purposes of alignment of the forks of a forklift; and front plate 110 to which the electrical components, interconnecting electrical cabling, side plates 111, optical alignment source 114 and other system components are attached.

Figure 7:
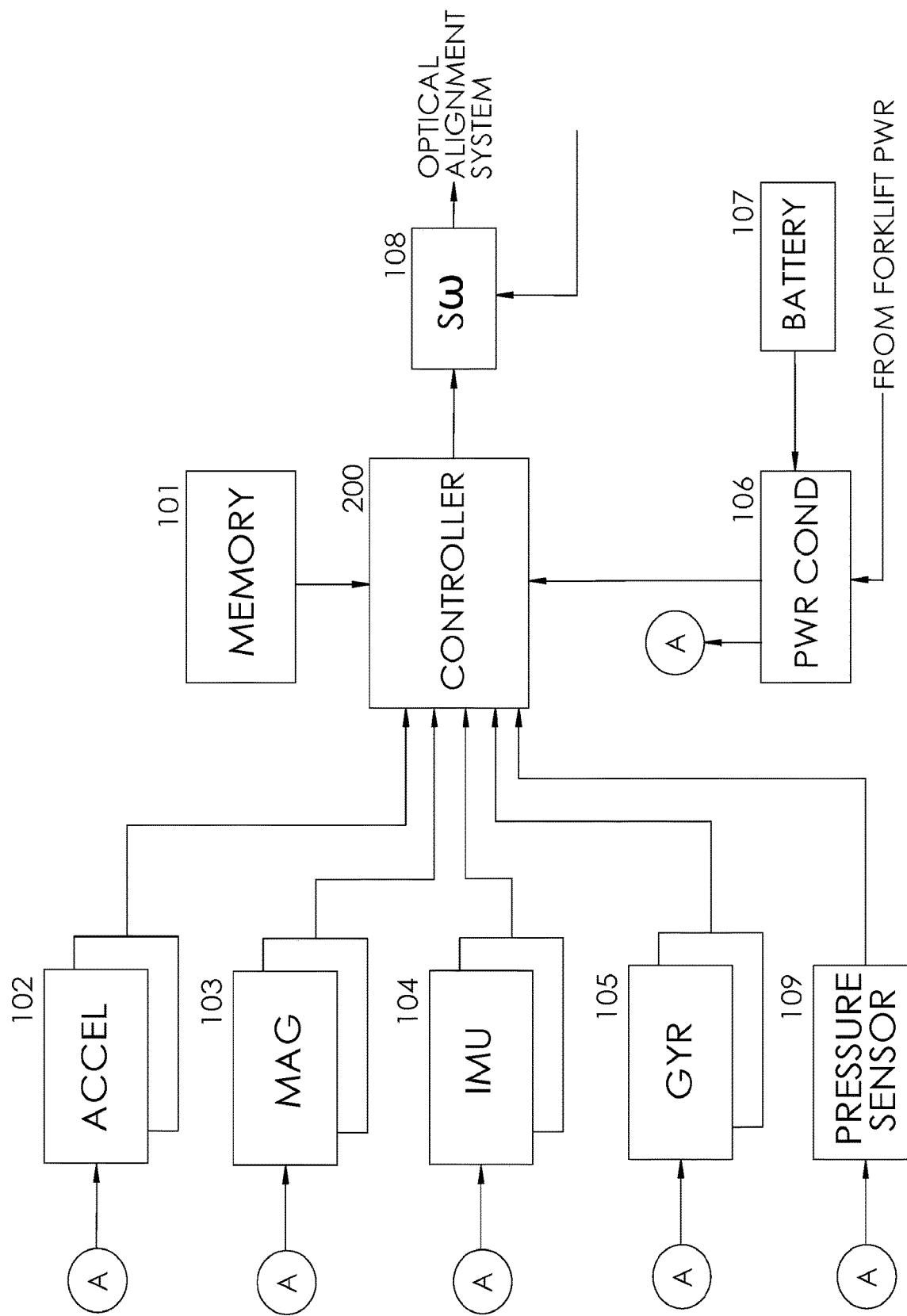
FIG. 7 depicts an electrical block diagram of an embodiment of the invention.

Referring now to FIG. 7, a block diagram of an embodiment of the invention is depicted. Controller 200 may be any electronic device or combination of devices capable of executing non-transitory computer readable instructions such as a microprocessor, a controller, a firmware controller, discrete logic, Programmable Array Logic (PAL), a Field Programmable Gate Array (FPGA), a Microcontroller Unit (MCU) or any combination of these or equivalent structures. Memory 101 is any physical non-transitory Computer Readable Media (CRM) capable of storing non-transitory computer readable and executable instructions. Controller 200 is in electrical communication with CRM 101; alternatively, CRM 101 may be external media that physically separate from controller 200 or may be wholly or partially integrated into controller 200. The apparatus of the invention may comprise one or more sensors, in any combination, described herein such as one or more accelerometers 102, one or more magnetometers 103, one or more IMUs 104, one or more gyroscopes 105, and one or more pressure sensors 109. The invention may comprise any quantity of each type of these sensors; i.e., may comprise one or more of each type of sensor, in any combination. Each sensor is in data communication with controller 200 and produces at least one sensor signal proportional to a measured parameter. The apparatus may be powered by battery 107, which may be in electrical communication with controller 200, memory 101, and each of the sensors 102-105 and 109. In an alternative embodiment, one or more of sensors 102-105 and 109 may be located in optical alignment system 001, or remotely located from optical alignment system 001 and may be connected to their own source of electrical power which may be, for example, a battery. For example, sensors of the invention, or even the entire apparatus or portion of the apparatus, may be located on an inside surface of one of the forks of a forklift as is depicted by point E in FIG. 1. In this embodiment, each sensor that is located remotely from the apparatus is in data communication with the apparatus of the invention either wirelessly by, for example RF means such as the radio frequency standard known as Bluetooth® or other RF communication means, or may be in data communication with the apparatus of the invention by optical or wired means. Any form of known data communication is within the scope of the invention. In an embodiment, the apparatus the invention may be directly powered by an external source of power, such as a forklift battery.

Still referring to FIG. 7, battery or other power source 107 may be in electrical communication with a power conditioning circuit 106 which may comprise circuitry such as active power conditioning, passive filters, voltage regulators, current limiters, fuses or circuit breakers. Power conditioning circuit 106 may in turn communicate electrical power to the electrical components of the invention such as controller 200, memory 101, and each of the sensors 102-105 and 109. Switch 108 may be an electrically controlled device that is controllable to switch electrical power to the external electromechanical system such as an optical alignment system for a forklift. Switch 108 may be, for example, a power transistor or transistors, electrically controllable relay, or any other device known in the art that is electrically controllable for switching electrical power to a load on or off.

Figure 8:
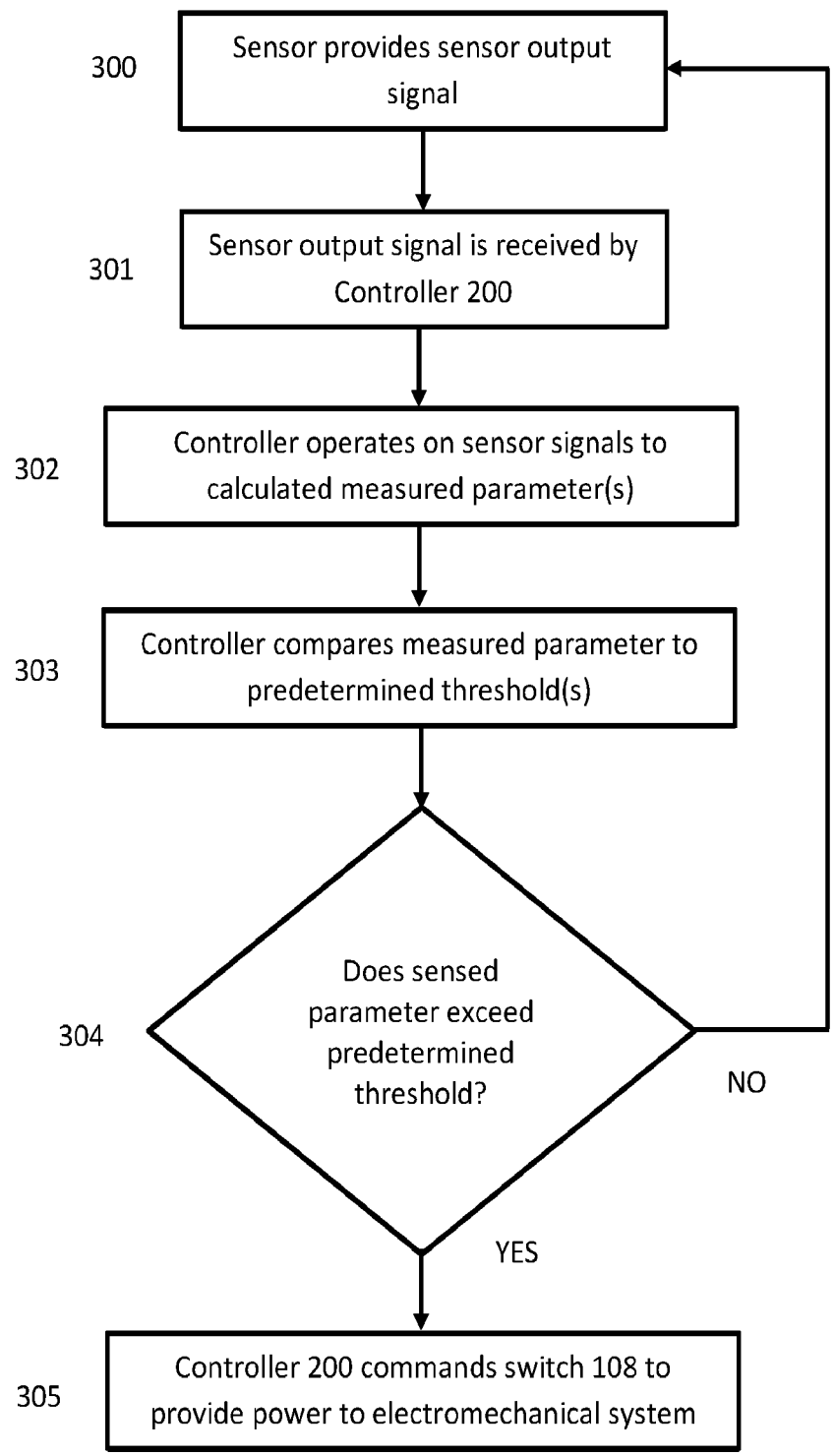
FIG. 8 depicts a flow chart of a method of the invention.

Referring now to FIG. 8, controller 200 may carry out the functions, or steps, of the invention by executing non-transitory computer readable instructions it has retrieved from CRM 101. The steps of the invention include the sensors of the invention producing output signals that are proportional to a measured physical parameter 300, receiving the sensor output signals 301, operating on the received sensor signals to calculate a measured parameter such as apparatus acceleration, velocity, position, orientation, translation, angular velocity, ambient atmospheric pressure, magnetic field, or vibration 302; comparing the measured parameters to predetermined thresholds 303; determining whether predetermined thresholds or threshold ranges for any of the sensor signals has been exceeded by a measured parameter 304; and providing an activation signal to an electromechanical device in the case that one or more predetermined thresholds or threshold ranges for any of these sensor signals has been exceeded 305.

In the description and claims, translation and orientation of the apparatus are designated as relative to an axis of an XYZ three axis coordinate system as shown in FIG. 1. The Z axis is referenced as the vertical direction. The origin is defined as the center of the optical aperture 009; however, any point of reference of the physical structure of the apparatus, or the structure to which the apparatus is attached, may be used for point of reference for the purpose of establishing a predetermined threshold, such as vertical height above the ground, for translation for purposes of ascertaining whether a threshold has been exceeded and thereby causing the controller 200 to output an activation signal. Likewise, any surface of the apparatus or the structure to which the apparatus is attached may be utilized as a reference to determine whether an orientation threshold or threshold range has been exceeded.

In operation, each sensor signal is received and processed by controller 200. The invention may comprise one or more of each sensor type, in any combination of sensors. The sensor may be used individually or collectively to determine the vibration, acceleration, velocity, position, angular velocity, orientation, magnetic field, or ambient atmospheric pressure of the apparatus (individually, each a "sensed parameter" and collectively the "sensed parameters").

Acceleration and vibration may be determined by processing the sensor signal of at least one accelerometer, or a plurality of accelerometers. Controller 200 may process the sensor signal of at least one accelerometer to determine acceleration and vibration at the location of the accelerometer using the sensor signal from the accelerometer or plurality of accelerometers, and using computer readable instructions comprise instructions for determining whether determined vibration isolation and filtering and acceleration data used for velocity and position calculations has exceeded predetermined thresholds or threshold ranges. The predetermined thresholds or threshold ranges may be stored in CRM 101. For example, a predetermined threshold for extraneous vibration data may be set at 5 Hz, 10 Hz, 20 Hz, or any other desired value. Vibration in excess of this threshold may be filtered out through mechanical vibration isolation means, or selection of electronic component (e.g. resistors, capacitors, etc.) or through DSP to reduce the noise in acceleration data used to calculate velocity and position, and when position such as vertical height above the ground, for example, 8 ft., is exceeded, the controller may then produce an output activation signal to the electromechanical system which may be, for example, the optical alignment system for a forklift. Controller 200 may implement DSP such low pass, high pass, or band pass filters to remove measured frequencies that are outside the frequencies of interest. In an embodiment, "frequencies of interest" may mean only the frequency range that is useful for determining acceleration and the calculated velocity and position parameters. The values for these frequencies of interest may be, for example, determined empirically or theoretically and stored in CRM 101. Thus, for example, a low pass frequency may be set at 20 Hz, or a bandpass frequency range may be set with a low pass value of 0 Hz and a high pass value of 20 Hz. The filters, if any, precede the determination of vibration by controller 200. Thus, in the high pass case, frequencies below the high pass frequency cutoff are not included in controller 200's determination of acceleration, velocity, or position. Likewise, in the low pass case, frequencies above the high pass frequency cutoff are not included in controller 200's determination of acceleration, velocity, or position. In the band pass case, frequencies below the high pass frequency and above the low pass frequency are not included in controller 200's determination of acceleration, velocity, or position. Also, controller 200 may implement DSP such that accelerations of certain amplitudes are outside the accelerations of interest to be used for calculating velocity and position. For example, accelerations that have an amplitude exceeding 2 g, 3 g, 4 g, or 5 g in any direction are likely impacts of the forklift or forks with an object and may not be useful acceleration sensor signals for calculating velocity and position. Also, controller 200 may implement parameter algorithms such that measured velocities in a certain direction and/or magnitude and/or for certain amounts of time can be ignored, and reset the velocity to zero and reset the position parameter to the value that is was at when the velocity drift (i.e. calculation error) first began. For example, if the velocity is below a minimum threshold of 0.05 m/s in the Y axis for more than 20 seconds with no other sensor parameters changing, then we know this is a calculation error since the forklift will not be traveling sideways on its wheels that are designed to go in the +/−X axis direction, the slow velocity for such a long period of time is not likely and may likely exceed real world physical limitations such as room size, aisle size, etc., and the velocity can be reset to be 0 m/s and the position parameter may be set to the value when the constant 0.05 m/s velocity calculation error began. In yet another example, at least one accelerometer's acceleration signal data in any of the X, Y, or Z axes as depicted in the figures, the orientation and angle of the sensor and apparatus may be calculated to ascertain whether apparatus and forks are disposed within a predetermined angle range for controller 200 to send an activation signal to the electromechanical system. This embodiment is useful in the exemplary case in which the electromechnical system is an optical alignment system for a forklift. In this example, the invention enables the forklift operator to know whether the forks are parallel to the ground within a certain angle range for easy insertion into a pallet. In yet another example, sensor fusion can be utilized with the accelerometer and the pressure sensor to help ascertain fork movement up or down. Forklift acceleration and vibration characteristics vary significantly across manufacturers and models (e.g. gas powered, electrical powered, etc.) and some may have an excessive vibration environment such that the accelerometer can identify the sensor signal that indicates fork movement up or down, but may find it difficult to ascertain the direction of the fork movement. In such cases, as an example, sensor fusion with a pressure sensor signal may be used to indicate direction which will then help the accelerometer calculate position and the controller may activate the electromechanical system.

Angular velocity, magnetic fields, acceleration, velocity, position, or translation, of the apparatus in any direction relative to the XYZ orthogonal three-axis coordinate system may be determined by processing the sensor signal from one or more IMUs which comprise information proportional to the non-gravitational and gravitational acceleration, angular velocity, and magnetic field changes of the apparatus in each of an X, Y and Z direction defined by the XYZ three axis orthogonal coordinate system. IMUs may comprise a combination of at least one accelerometer, gyroscope, and/or magnetometer. Controller 200 receives sensor signals from each IMU and operates on them to calculate angular velocity, translation, acceleration, velocity, or position of the sensors in each of the X, Y, or Z direction. When a known starting position is used, this translation information may be utilized by controller 200 to determine the position of the sensor. When angular velocity, acceleration, linear velocity, angle, translation or position has exceeded a predetermined value, controller 200 may operate to produce an activation signal to the electromechanical system. The method of the invention may also comprise steps for "zeroing" the known starting position or setting a position parameter value by setting the parameter in accordance with nominal forklift operations and standard safety practices. Thus, for example, the predetermined threshold may be set at 10 feet of total translation in the XY plane, and this value may be stored in CRM 101. When the IMU or IMUs of the system provide sensor signals that are used by the Controller to determine that the sensors have been translated more than 10 feet in the XY plane, controller 200 may set the position in the +Z direction value, for example, to be 2 ft. above the ground and produce a deactivation signal to the electromechanical system since 2 ft. above the ground does not exceed the predetermined threshold of 8 ft. in the Z direction. With this setting of the Z direction position value to 2 ft. the electromechanical system would then use the accelerometer signals to calculate the velocity and position above the ground from that 2 ft. value. In the case in which the electromechanical system is an optical alignment system of a forklift, the optical sources of the optical alignment system may thus be activated or deactivated, in other words, powered on or powered off, respectively. This synchronizes the electromechanical system with nominal forklift operations and safety practices such that when a forklift is driving across the ground, the forks are disposed close to the ground and not high off of the ground for safety reasons and to meet safety standards. Likewise, the predetermined threshold for translation in the Z direction may be eight feet. In this case, controller 200 may produce an activation signal to the electromechanical system when controller 200 determines that the electromechanical system has translated more than eight feet in an upward direction. Thus, when the electromechanical system is an optical alignment system for a forklift, the apparatus of the invention may produce an activation signal to turn on the optical alignment system when the forks have been translated more than eight feet in the vertical, or Z, direction. Predetermined thresholds for translation in any of the X, Y, or Z direction may be combined to set compound predetermined thresholds, for example, controller 200 will produce a deactivation signal in the case in which the apparatus has translated beyond a predetermined value in the XY plane and set the Z direction threshold to, for example, 2 ft. above the ground, and sequentially has also translated beyond a predetermined value in the Z direction, for example, an additional 6 ft. above the 2 ft. value just established, the controller 200 will produce an activation signal. In the case where position, rather than translation, is utilized as the parameter to be measured, a known starting position may be utilized, and controller 200 may then continually calculate the position of the apparatus by combining the calculated translation of the apparatus in any of the X, Y or Z axes with the known starting position. As an example, upon power up, controller 200 may assume that the forks of a forklift are on the ground. Thus any translation of the sensors in the Z direction may be combined with the known starting ground position in order to determine the actual position of the forks in the vertical, or Z axis, direction above the ground. When the calculated position of the forks in the Z direction exceed a predetermined value, for example, eight feet, controller 200 may operate to produce an output activation signal causing the forklift optical alignment system to activate. In another example for "zeroing" a parameter in the software, a forklift operator may place the forks on the ground for more than a predetermined time, after which time the controller, sensing no movement of the forks, may store a value in CRM 101 for indicating that the forks are at a ground position of 0 ft., and any translation in the Z direction after this time may be used to calculate the vertical, or Z axis, position of the forks. This makes use of nominal forklift operations per safety standards that when forklifts are not in use the forks should be at rest on the ground and not above the ground for safety reasons.

Angular velocity of the apparatus relative to the XYZ orthogonal three-axis coordinate system may be determined by processing the sensor signal from one or more gyroscopes. Controller 200 may process these sensor signals so that the angular velocity at any given time may be ascertained, and if the apparatus exceeds a predetermined threshold or threshold ranges relative to any of the X, Y or Z axes, controller 200 may produce an activation signal to the electromechanical system. In the case in which the electromechanical system is an optical alignment system for a forklift, the apparatus of the invention may produce an activation signal if the forklift has been maneuvered so as its angular velocity is within a predetermined threshold range relative to any of the X, Y or Z axes, or if it has an angular velocity exceeding a predetermined threshold of rotation in any of these axes. For example, using at least one gyroscope's angular velocity signal, it can be determined if the forklift is in motion and controller 200 may produce an activation signal to the electromechanical system. Furthermore, at least one gyroscope measured angular velocity signal can determine if the fork operator is adjusting the angle of the mast and forks which can be used to active the electromechanical system. For example, if the angular velocity is programmed in controller 200 to have a threshold of 5 degrees per second about the Y axis (in the X-Z plane), then in the case in which the gyroscope sensor signal is less than that threshold it is likely the forklift operator is changing the angle of the forks and mast for proper alignment of the forks which means the electromechanical system should be activated. If the angular velocity signal exceeds the predetermined threshold of 5 degrees per second, then this is likely due to the forklift going up or down a ramp or over a speed bump or similar. The predetermined threshold programmed in controller 200 can be set anywhere between the range of 0 degrees per second to 60 degrees per second, for example, inclusive, 5 degrees per second, 10 degrees per second, 15 degrees per second, 30 degrees per second, or 45 degrees per second.

Angular orientation of the apparatus relative to the Earth's magnetic field may be determined by processing the sensor signal from one or more magnetometers. Magnetic field measurements are vectors in that they have a magnitude (i.e. strength) and they have a direction. Controller 200 may process these sensor signals so that the angular orientation at any given time may be ascertained relative to magnetic lines of flux in a magnetic field, and if the angle of apparatus relative to the magnetic field changes, controller 200 may produce an activation signal to the electromechanical system. In the case in which the electromechanical system is an optical alignment system for a forklift, the apparatus of the invention may produce an activation signal if the forklift has been maneuvered so as to be oriented within a predetermined range of angles relative the Earth's magnetic field, or if it has rotated past a predetermined threshold of rotation relative to the Earth's magnetic field. As the Earth's magnetic field is generally oriented in a north direction, the angular orientation of the apparatus relative to a north direction may be determined, and the apparatus may produce the activation signal when a predetermined orientation threshold from north has been exceeded by the apparatus.

In an embodiment, the orientation of the apparatus relative to a magnetic field produced by a magnet, such as a Neodymium magnet placed on a surface of a forklift, may be determined by processing the sensor signal from one or more magnetometers. Controller 200 may process these sensor signals so that the magnetic field at any given time may be ascertained and if the apparatus moves within this magnetic field and satisfies predetermined thresholds or threshold ranges, controller 200 may produce an activation signal to the electromechanical system. For example, the Earth's magnetic field at the surface of the Earth has a magnitude of approximately 25 to 65 microteslas (0.25 to 0.65 gauss) depending on the geographic location of the apparatus on the Earth's surface. If the magnitude of the magnetometer sensor signal exceeds that range then there is another magnetic field present in addition to the Earth's. So if the magnetometer signal is higher than 65 microteslas, and the measured magnetic field strength decreases at a rate of approximately $1/r^3$ (r is the distance from the magnetometer to the magnet) at a certain rate with respect to time then the magnetometer is moving away from the magnet at a calculable velocity and controller 200 may calculate the velocity and produce an activation signal to the electromechanical system when a calculated position threshold has been exceeded (e.g. 8 ft above the ground). Since the apparatus and magnetometer are attached to the forklift forks/carriage and the magnet is placed on the stationary part of the forklift that does not travel with the forks/carriage/apparatus, a reduction in magnetic field means the apparatus is moving upward or downward, or in the positive Z direction or negative Z direction, since that is the only direction the apparatus will move relative to the magnet when it is attached to the forklift forks/carriage. The predetermined values for the magnetic field thresholds and threshold ranges in controller 200 can vary and must be ascertained by the programmer using the magnetometer sensor characteristics (such as noise, sensitivity, resolution), the size of magnet (magnitude of the magnetic field), the orientation and position of the magnet on the forklift relative to the magnetometer, the distance between the magnetometer and magnet at varying apparatus position relative to the ground as it travels upward in the positive Z direction.

In yet a further example, a magnet may be placed on a stationary part of the forklift that is, for example, 4 ft. above the ground. The magnetometer in the apparatus may be disposed at a location 0.5 ft. above the ground when the forks are at rest on the ground. As the forks and apparatus move upward in the positive Z direction, the magnetometer will output a signal indicating an increase in the magnitude of the magnetic field and the magnetic field magnitude will be maximized when the magnetometer is at the same height as the magnet of 4 ft. Once the apparatus passes the magnet and continues moving upward, the magnetic field will decrease. The magnet is oriented such that the magnetic field poles are pointing toward the magnetometer as it passed by the magnet, and the shortest distance between the magnetometer and magnet would be, for example, 6 inches, the controller 200 parameters can take all of this information and may produce the activation signal when a predetermined orientation threshold has been exceeded by the apparatus such as being above 8 ft. from the ground. If the magnetometer characteristics, magnet, magnetic field, orientation of the magnet, etc. is such that a direct position of the magnetometer relative to the magnet cannot be ascertained because the magnetic field at that distance from the magnet is too low to be able to be sensed by the magnetometer, the rate of change of the magnetic field as the magnetometer passed through it can be used to calculate the velocity of the magnetometer moving in the upwards direction which can then be assumed to be approximately constant and use a certain amount of time to pass to estimate the apparatus position above the ground and activate the apparatus.

In yet a further example, the magnetometer may receive a sensor signal for the Earth's magnetic field over a predetermined amount of time (e.g. 1 hour) and program that average sensor signal magnitude over time as a baseline to be referenced as it processes new sensor signals. This baseline reference for the Earth's magnetic field will be within the range of 25-65 microteslas depending on the sensor(s) location on Earth. When the sensor signal exceeds a predetermined threshold range (e.g. 10% of the Earth's magnitude reference baseline) then that can be attributed to a disturbance in the magnetic field. And this disturbance in the magnetic field can be a magnet placed on the forklift or it can be from the ferrous metals of the forklift. This sensor signal information can be used to activate the electromechanical system. For example, if the magnetometer sensor signals magnitude is 40+/−2 microteslas when the magnetometer and forklift faces East, West, and South but then exceeds 50 and/or 30 microteslas as the magnetometer and forklift rotate to face North, then this is likely attributed to the ferrous metals in the forklift disturbing the Earth's magnetic field. Under this same scenario if the magnetometer and forklift is facing North then measures 40+/−2 microteslas after it was exceeding 50 and/or 30 microteslas this may be attributed to the apparatus and forks being above the forklift which may activate the electromechanical system. This may also use sensor fusion to measure the signals from the accelerometer(s) and/or pressure sensor(s) to reaffirm the forks have moved in the +Z axis.

In yet a further example, the magnetometer may measure the direction of the Earth's magnetic field vector. The direction of the Earth's magnetic field vector will have an angle to the X-Y plane of the magnetometer and with the forklift's X-Y plane. The forklift's mast may tilt forward or backward several degrees (e.g. 5 degrees depending on Forklift model and manufacturer). So if the magnetometer sensor signals of the Earth's magnetic field direction change several degrees outside of the forklifts full tilt range then this is a disturbance in the measured magnetic field which may activate the electromechanical system. Sensor fusion can be applied such that if the magnetic field vector direction changed a predetermined threshold with the X-Y plane of the magnetometer (e.g. 3 degrees) and there was not a corresponding gyroscope sensor signal to reaffirm the change in angle of the apparatus changing its angle, then this not due to the forklift mast tilting forward or backward and this is a disturbance in the magnetic field which may activate the electromechanical system. Sensor fusion can also be applied using at least one accelerometer sensor signal measuring the Earth's gravity vector. If there is a change in the angle between the Earths' magnetic field vector and the Earth's gravity vector exceeding a predetermined threshold (e.g. 5 degrees), then this can be attributed to a change in the magnetic field which the controller 200 may send an activation signal to the electromechanical system.

Figure 9:
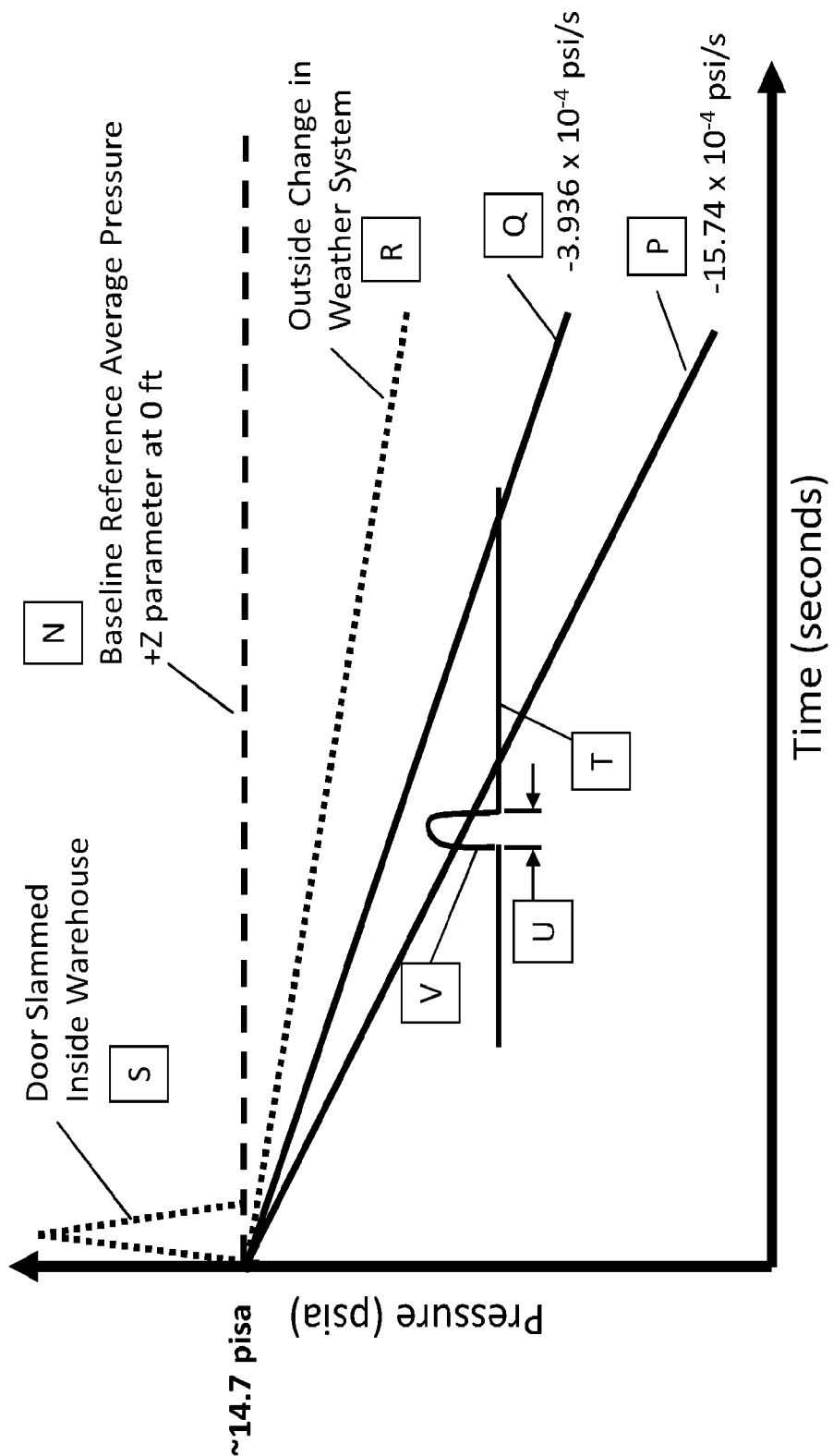
FIG. 9 depicts a plot of change in air pressure over time when the invention is raised away the ground towards a raised position, i.e. moving from lesser value on the Z axis to a greater value on the Z axis, shown plotted against the air pressure changes due to various events including a local door being slammed when the invention is located in an enclosed building, such as a warehouse, and a change in the environment, which may be caused, for example, by a change in a local weather system.
Figure 10:
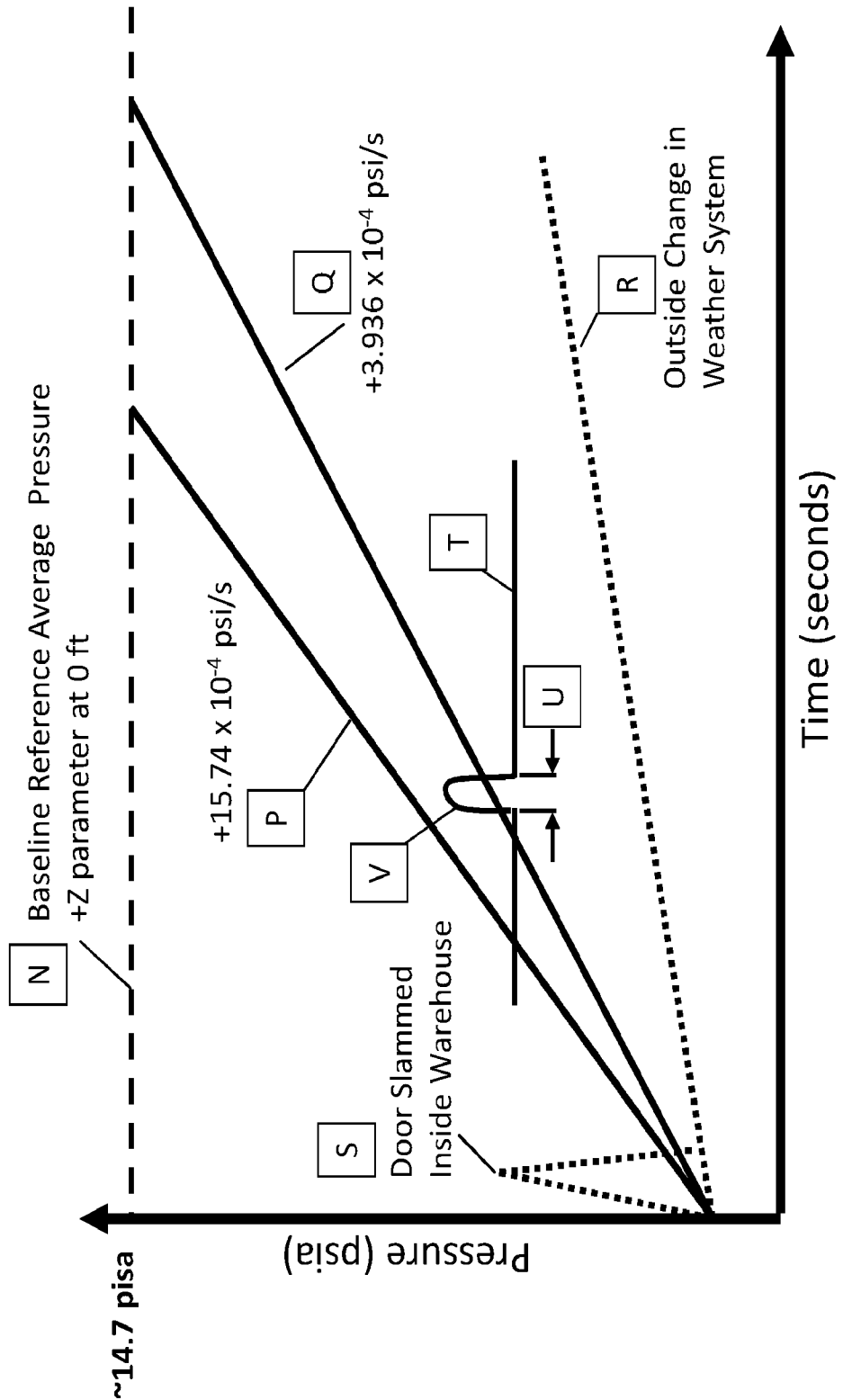
FIG. 10 depicts a plot of change in air pressure over time when the invention is lowered towards the ground from a raised position, i.e. moving from greater value on the Z axis to a lower value on the Z axis, shown plotted against the air pressure changes due to various events including a local door being slammed when the invention is located in an enclosed building, such as a warehouse, and a change in the environment, which may be caused, for example, by a change in a local weather system.

Referring now to FIGS. 9 and 10, the position of the apparatus along the Z axis with respect to the ground can be determined by processing the sensor signal from one or more pressure sensors. Controller 200 may process these pressure sensor signals so that the ambient air pressure at any given time may be ascertained, and if the apparatus moves in the Z axis and the accompanying air pressure signals exceeds predetermined thresholds or threshold ranges, controller 200 may produce an activation signal to the electromechanical system. Air pressure is known to depend on the height above the ground (altitude). The pressure sensors of the invention, which may be MEMS devices, have characteristics (e.g. accuracy, resolution, sensitivity, etc.) are such that they can accurately measure changes in altitude down to a change in position along the Z axis of at least 0.3 m or less with current technology, and are expected to become more accurate over time. The rate of pressure increase or decrease can be directly correlated to nominal forklift operations such as the nominal range of upward/downward velocities of the forks/carriage. The parameters that affect air pressure change relative to change in altitude (such as air temperature, air humidity, air density) can be assumed to be at certain parameters where the apparatus is used (e.g. inside warehouses at 72 degrees Fahrenheit, or a freezer at −10 degrees Fahrenheit) or they can be directly measured using temperature sensors, humidity sensors, etc. Some MEMS pressure sensors have temperature sensors already build in them to ascertain more accurate pressure readings. The nominal forklift fork/carriage upward and downward velocities vary significantly across forklift manufacturers, forklift models, forklift class (e.g. Class 2 or Class 3), and the weight of the load that the forks are lifting up or down. Also, ambient air conditions vary significantly depending on the environment the forklift is used for, such as freezers, inside the warehouse, or outside in the sun. Given these conditions, the apparatus controller 200 can ascertain the rate of change in pressure and correlate that to a velocity which can be used to calculate the change in height above the ground over time. Values for the rate of change in air pressure that are outside of the predetermined thresholds or threshold ranges in controller 200 can be correlated to other causes that are not considered in the apparatus velocity or position calculation above the ground. For example, if the rate of change in pressure is lower than the pre-determined threshold range, then this can be attributed to another cause that is not the forks/apparatus increasing or decreasing the height relative to the ground, such as a change in the weather system (e.g. a lower pressure system or storm is developing). For example, if the rate of change in pressure is higher than the pre-determined threshold range, then this can be attributed to another cause that is not the forks/apparatus increasing or decreasing its height relative to the ground, such as someone closing or opening a door in close proximity to the apparatus, or the facility air conditioning system turning on or shutting off.

Still referring to FIGS. 9 and 10, examples of an embodiment of the invention utilizing pressure sensor signals to calculate the Z axis position are depicted.

FIG. 9 depicts an exemplary plot of change in air pressure over time when the invention is raised away from the ground towards a raised position, i.e. moving from lesser value on the Z axis to a greater value on the Z axis, shown plotted against the air pressure changes due to various events including a local door being slammed when the invention is located in an enclosed building, such as a warehouse, and a change in the environment, which may be caused, for example, by a change in a local weather system. As the apparatus and forklift forks are raised above the ground from a starting position, i.e. as the apparatus is translated upward in the Z direction so that the value of Z increases, the baseline reference average pressure around the apparatus starts at a value N, for example, and decreases at a rate proportional to the rate of the increase in height above the ground. The controller 200 of the apparatus receives a sensor signal from at least one pressure sensor that indicates the drop in measured air pressure over time. As described above, the controller will activate the electromechanical system if the change air pressure over time, i.e. the rate of change of air pressure, is within predetermined the limits Q and P, in order to filter out known environmental or other effects or events such as a pressure change due to weather systems depicted as R in the figure, or pressure change due to the slamming of a door depicted as S in the figure. In this manner, the controller avoids being "fooled" into concluding that the apparatus is moving when a slamming door or weather system cause a change in air pressure, because the apparatus is not designed to move so slowly so as to result in the rate of change of measured pressure shown as R, nor is it designed to move so quickly so as to result in the rate of change of measured pressure shown as S and thus the controller will not activate the electromechanical system unless the measured rate of change of air pressure is between predetermined rates of change Q and P.

FIG. 10 depicts a plot of change in air pressure over time when the invention is lowered towards the ground from a raised position, i.e. moving from greater value on the Z axis to a lower value on the Z axis, shown plotted against the air pressure changes due to various events including a local door being slammed when the invention is located in an enclosed building, such as a warehouse, and a change in the environment, which may be caused, for example, by a change in a local weather system. As the apparatus and forklift forks are lowered toward the ground from a starting elevated position, i.e. as the apparatus is translated downward in the Z direction so that the value of Z decreases, the baseline reference average pressure around the apparatus starts at a value N, for example, and increases at a rate proportional to the rate of the increase in height above the ground. The controller 200 of the apparatus receives a sensor signal from at least one pressure sensor that indicates the rise in measured air pressure over time. As described above, the controller will activate the electromechanical system if the change air pressure over time, i.e. the rate of change of air pressure, is within predetermined the limits Q and P, in order to filter out known environmental or other effects or events such as a pressure change due to weather systems depicted as R in the figure, or pressure change due to the slamming of a door depicted as S in the figure. In this manner, the controller avoids being "fooled" into concluding that the apparatus is moving when a slamming door or weather system cause a change in air pressure, because the apparatus is not designed to move so slowly so as to result in the rate of change of measured pressure shown as R, nor is it designed to move so quickly so as to result in the rate of change of measured pressure shown as S and thus the controller 200 will not activate the electromechanical system unless the measured rate of change of air pressure is between predetermined rates of change Q and P.

For example, at a temperature of 72 degrees Fahrenheit at sea level and 10 ft. above sea level the difference in pressure is approximately 0.006 pound per square inch (psi). And the average forklift's carriage/forks lift and lower velocity is within the range of 0.2 meters per second (m/s) to 0.8 m/s (0.656 ft/s to 2.642 ft/s). This means that the amount of time it will take for the forks/carriage to travel upwards in the +Z direction a distance of 10 ft. will be in the range of 15.24 seconds to 3.81 seconds. This equates that the rate of change in pressure as the forks/carriage move upward in the +Z direction will be in the range of $-3.936 \times 10^{-4}$ psi/s to $-15.74 \times 10^{-4}$ psi/s. This equates that the rate of change in the pressure as the forks/carriage move downward in the −Z direction will be in the range of +3.936×10$^{-4}$ psis to +15.74×10$^{-4}$ psi/s. The pressure sensor and controller can set a reference baseline of average pressure for a predetermined amount of time, for example 2 minutes, when the velocity was 0 m/s and the +Z parameter at 0 ft., and when a pressure rate of change is within the predetermined threshold range of −3.936×10$^{-4}$ psis to −15.74×10$^{-4}$ psis then the controller may activate the electromechanical system after a calculated distance has been traversed (for example, 10 ft. in the +Z direction). The enclosure of the pressure sensor may have varying sizes orifices that can affect the rate of change of pressure inside the enclosure, and consequently what the pressure sensor will sense that may be located inside the enclosure. For example, if the orifice between the inside and outside of the enclosure is 1 inch, then the air flowing through the orifice will be unrestricted to the point such that the pressure sensor signal measurements will nearly instantaneously coincide with the pressure changes outside of the enclosure. If the orifice is too small (e.g. 0.0001 inch) then this may restrict the flow of air such that there will be a difference in the rate of change in pressure outside of the enclosure compared to the rate of change inside the enclosure where the pressure sensor may be located. If the designer chooses to mitigate moisture intrusion into the enclosure and chose to not use an orifice but use a flexible membrane that can flex under a differential pressure between the inside and outside of the enclosure, this may affect the rate of change of pressure as seen by the pressure sensor inside the enclosure compared to the outside of the enclosure. This should be taken into account by the programmer when establishing the predetermined thresholds or threshold ranges to be exceeded which may activate the electromechanical system.

Still referring to FIGS. 9 and 10, sensor signals T from the magnetometers or accelerometers of the invention may be fused with the pressure sensor data by controller 200 (not shown in FIGS. 9 and 10, but shown in FIG. 7), to provide input to controller 200 such that controller 200 commands the electromechanical system, which may be a forklift optical alignment system, to an ON or OFF state. When the forks are translated up or down, i.e. in the positive Z direction or negative Z direction, respectively, the magnetometer signal will exhibit a temporary increase in output signal, or pulse, V during a duration U; or, in the case of accelerometer signals, the accelerometer output signals may exhibit a temporary increase in output signal, or pulse, V during a duration U. If, during the time period U, the pressure sensors of the invention output a signal that indicate the pressure is decreasing (as in FIG. 9) or increasing (as in FIG. 10), the controller 200 may fuse, or combine, this data to infer that the forks are moving, and controller 200 may then activate the electromechanical system. This inference is appropriate because the magnetometer and/or accelerometer data provides an indication of movement, and the change in pressure over time U indicates translation in the +Z or −Z direction.

INDUSTRIAL APPLICABILITY

The invention is a novel, autonomous activation system and method that is operable to activate any electromechanical system in response to sensor signals that are proportional to the ambient air pressure, magnetic field, angular velocity, acceleration, velocity, position, vibration, orientation, or translation of the system. The sensor may comprise accelerometers, gyroscopes, magnetometers, Inertial Measurement Units, or pressure sensors in any combination and in any quantity. The sensor output signals are processed by a controller executing non-transitory computer readable instructions to determine ambient air pressure, magnetic field, angular velocity, acceleration, velocity, position, translation, orientation or vibration of the system, and if one or more predetermined thresholds are met or exceeded, the system provides an activation signal to an electromechanical system that may utilize the activation signal to transition from a dormant, or OFF state, to an operational, or ON state.

The system and method of the invention may be utilized to activate any of a large number of electromechanical systems, and thus has broad industrial applicability. A typical exemplary application, and one that is claimed, is the activation of forklift optical alignment systems that enable forklift operators to align the forks of a forklift to a load to be carried by the forklift. The autonomous activation system and method of the invention may be used to place a forklift optical alignment system in an operational state when, for example and not by way of limitation, the forklift accelerations exceeds a predetermined threshold or range of thresholds indicating the forklift is in use, or should the forklift translate a predetermined distance, or should the forks translate in the vertical, Z axis, direction a predetermined distance. In these exemplary cases, the forklift optical alignment system may be autonomously placed into an operational, or ON, state without any input or action by the forklift operator, reducing the operator's workload and enabling more efficient operation of the forklift. The system of the invention also reduces the risk of exposing eyes to an optical alignment beam to persons in the vicinity of the forklift, as it may be utilized to prevent activation of the forklift optical alignment system when the forklift optical alignment system, which may comprise laser optical sources, is below a predetermined height from the ground.

What is claimed is:

1. An apparatus for autonomous activation of an optical forklift alignment system, comprising:
    at least one sensor configured to produce at least one sensor signal proportional to one or more parameters of the apparatus, the at least one sensor selected from a group of sensor types consisting of accelerometers, gyroscopes, and magnetometers;
    a tangible computer-readable media storing a first threshold or threshold range; and
    a controller in data communication with said at least one sensor, the controller configured to:
       determine, during a first time period, that the apparatus is in a non-motion state along or about a defined axis;
       receive, after the first time period, a first set of measurements from the at least one sensor indicating motion of the apparatus along or about the defined axis;
       calculate, at a second time, a value representative of a change in position of the apparatus along or about the defined axis based on the first set of measurements;
       compare the value to the first threshold or threshold range; and
       provide the activation signal as a result of a determination that the value exceeds the first threshold or threshold range.

2. The apparatus of claim 1, further comprising:
    a housing attachable to a structure of a forklift, the housing containing at least the controller and the tangible computer-readable media, an optical alignment source of the optical forklift alignment system coupled to or exposed on an exterior surface of the housing, wherein the activation signal causes the optical alignment source to transition between a light-emitting state and a non-light-emitting state.

3. The apparatus of claim 1, wherein said at least one sensor is further defined as at least one accelerometer, said first set of measurements indicate acceleration of the apparatus along at least the defined axis, and said controller is configured to calculate a position of the apparatus along or about the defined axis based on the first set of measurements.

4. The apparatus of claim 3, wherein the controller is configured to implement a low pass filter that filters frequencies above a predetermined low-pass cutoff frequency prior to calculation of the values.

5. The apparatus of claim 1, wherein said controller is configured to:
calculate a translation of the apparatus in one or more directions transverse to the defined axis; and
determine whether said translation exceeds a second threshold or threshold range relative to a reference position.

6. The apparatus of claim 5, wherein the controller is configured to determine the non-motion state as a result of a determination that the translation exceeds the second threshold or threshold range.

7. The apparatus of claim 5, wherein said translation is determined in an XY plane from said reference position, and wherein said second threshold or threshold range is defined as a distance in the XY plane from said reference position.

8. The apparatus of claim 1, wherein said at least one sensor includes a gyroscope, wherein said at least one sensor signal includes information proportional to an angular velocity of the apparatus about one or more axes of an orthogonal XYZ three axis coordinate system, the first threshold or threshold range includes an angular velocity threshold or angular velocity threshold range, and wherein the controller provides the activation signal as a result of the information indicating an angular velocity that exceeds the angular velocity threshold or angular velocity threshold range.

9. The apparatus of claim 1, wherein said at least one sensor includes a magnetometer, wherein said at least one sensor signal includes information proportional to an orientation or a position of the apparatus relative to a magnetic field, the first threshold or threshold range includes a predetermined magnetic field threshold or magnetic field threshold range, and wherein the controller provides the activation signal as a result of the information indicating a magnetic field that exceeds the magnetic field or magnetic field threshold range.

10. The apparatus of claim 1, wherein the controller is configured to:
a. determine whether a second threshold or threshold range has been exceeded; and
b. set a Z-axis parameter to a defined reference value to correlate to the apparatus being disposed at a zero position, said zero position defined as a distance from an XY plane, said XY plane being defined as a level surface upon which the forklift is supported.

11. The apparatus of claim 10, wherein the controller is configured to determine whether the apparatus has translated more than a predetermined distance in the XY plane within a predetermined amount of time.

12. The apparatus of claim 1, wherein the defined axis extends along a height direction of the apparatus.

13. The apparatus of claim 10, wherein the at least one sensor is configured to measure the one or more parameters without reference to a signal from an external device.

14. The apparatus of claim 1, wherein said controller is configured to set, in response to electric power being applied to the apparatus, a calculated velocity parameter of the apparatus to be 0 m/s and a Z axis parameter of the apparatus to a predetermined value.

15. The apparatus of claim 14, wherein the predetermined value is zero.

16. The apparatus of claim 1, wherein the controller is configured to set, as a result of a determination that the value is a negative value, a Z axis parameter of the apparatus to a predetermined value.

17. The apparatus of claim 1, wherein the controller is configured to:
set a calculated velocity in the XYZ directions to be 0 m/s and a Z axis parameter to a predetermined value as a result of the apparatus remaining motionless or calculated parameters remaining unchanged for more than a predetermined period of time.

18. The apparatus of claim 17, wherein the predetermined value is zero.

19. An autonomously activated optical forklift alignment system, comprising:
an optical forklift alignment apparatus configured to receive an activation input signal and transition between a light-emitting state and a non-light-emitting state in response to receiving said activation signal; and
an autonomous activation apparatus communicatively coupled to said optical forklift alignment apparatus, said autonomous activation system including:
at least one sensor configured to produce at least one sensor signal proportional to one or more parameters of the autonomous activation apparatus, said at least one sensor being selected from a group of sensor types consisting of accelerometers, gyroscopes, and magnetometers; and
a controller communicatively coupled to said at least one sensor, the controller configured to:
determine, during a first time period, that the autonomous activation apparatus is in a non-motion state along a first direction;
receive, during a second time period after the first time period, a set of measurements from the at least one sensor indicating a motion state of the autonomous activation apparatus along or about the first direction;
determine a first value representative of a position of the autonomous activation apparatus along or about the first direction based on the set of measurements;
compare the first value to a second value representative of a reference position of the autonomous activation apparatus during the first time period; and
generate the activation signal in response to a determination that a difference between the first value and the second value exceeds a defined threshold or threshold range.

20. The autonomously activated optical forklift alignment system of claim 19, wherein controller determines the first value by at least mathematically integrating the set of measurements.

21. A method for operating an optical forklift alignment apparatus, comprising:
determining that the optical forklift alignment apparatus is in a non-motion state during a first time period;

receiving a set of measurements from at least one sensor during a second time period after the first time period, said at least one sensor configured to measure at least one parameter;

obtaining information representative of a predetermined threshold or threshold range from a data storage location;

calculating a change in position of the optical forklift alignment apparatus along a defined direction based on the set of measurements;

determining that the change in position of the optical forklift alignment apparatus exceeds said predetermined threshold or threshold range; and providing an activation signal to the optical forklift alignment apparatus as a result of determining that said change in position exceeds said predetermined threshold or threshold range, the activation signal causing the optical forklift alignment apparatus to change a state of activation.

22. The method of claim 21, wherein the at least one parameter is selected from a group of parameters consisting of linear acceleration, angular velocity, and magnetic field.

* * * * *